US008620862B2

(12) United States Patent
Holenstein et al.

(10) Patent No.: US 8,620,862 B2
(45) Date of Patent: *Dec. 31, 2013

(54) METHOD FOR ENSURING REFERENTIAL INTEGRITY IN REPLICATION ENGINES BY SERIALIZING BASE LEVEL CHANGE QUEUE DATA

(75) Inventors: Paul J. Holenstein, Downingtown, PA (US); Bruce D. Holenstein, Media, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,709

(22) Filed: Sep. 13, 2010

(65) Prior Publication Data

US 2010/0332448 A1 Dec. 30, 2010

Related U.S. Application Data

(62) Division of application No. 10/881,699, filed on Jun. 30, 2004, now Pat. No. 7,801,851.

(60) Provisional application No. 60/484,473, filed on Jun. 30, 2003.

(51) Int. Cl.
*G06F 7/00* (2006.01)
*G06F 17/00* (2006.01)

(52) U.S. Cl.
USPC .......................... 707/610; 707/613; 709/248

(58) Field of Classification Search
USPC ................... 707/610, 613, 634, 799, 999.202
See application file for complete search history.

(56) References Cited

U.S. PATENT DOCUMENTS 5,530,855 A * 6/1996 Satoh et al. .................. 707/648
5,581,749 A   12/1996 Hossain et al.
(Continued)

FOREIGN PATENT DOCUMENTS

EP    1 498 815 A2 *  1/2005
WO   WO 2004/013725 A2 *  2/2004
WO   WO 2005/086032 A1 *  9/2005

OTHER PUBLICATIONS

Sang Hyuk Son, "Replicated Data Management in Distributed Database Systems"; Department of Computer Science, University of Virginia; Charlottesville, Virginia 22903; ACM SIGMOD Record, vol. 17, Issue 4, Dec. 1988. pp. 62-69.*

(Continued)

*Primary Examiner* — Daniel Kuddus
(74) *Attorney, Agent, or Firm* — Panitch Schwarze Belisario & Nadel LLP

(57) ABSTRACT

A method is provided for processing base level data of a change queue that is not serialized at the logical level. The base level change queue data is transaction data previously posted to a source database. A logical replication engine is provided to replicate and post the change queue data to a target database in the order that the transaction data is stored in the change queue. Upon detection in the logical replication engine of change queue data that is not serialized at the logical level, the change queue data is reserialized at the logical level before the logical replication engine applies the change queue data to the target database. The change queue data that is not serialized at the logical level may be posted to the target database using asynchronous database access.

26 Claims, 34 Drawing Sheets

Use of a Transaction Serializer

(56) References Cited

U.S. PATENT DOCUMENTS

| | | | |
|---|---|---|---|
| 5,745,753 A | | 4/1998 | Mosher, Jr. |
| 5,761,500 A | * | 6/1998 | Gallant et al. .................... 1/1 |
| 5,781,910 A | | 7/1998 | Gostanian et al. |
| 5,799,305 A | | 8/1998 | Bortvedt et al. |
| 5,864,851 A | * | 1/1999 | Breitbart et al. .................. 1/1 |
| 5,870,761 A | * | 2/1999 | Demers et al. .................... 1/1 |
| 5,995,980 A | * | 11/1999 | Olson et al. ...................... 1/1 |
| 6,122,630 A | * | 9/2000 | Strickler et al. .................. 1/1 |
| 6,157,991 A | | 12/2000 | Arnon |
| 6,347,322 B1 | * | 2/2002 | Bogantz et al. ................... 1/1 |
| 6,446,077 B2 | * | 9/2002 | Straube et al. .................... 1/1 |
| 6,745,209 B2 | * | 6/2004 | Holenstein et al. ........... 707/615 |
| 6,839,767 B1 | | 1/2005 | Davies et al. |
| 6,975,595 B2 | | 12/2005 | Peterson |
| 6,978,396 B2 | | 12/2005 | Ruuth et al. |
| 7,177,866 B2 | * | 2/2007 | Holenstein et al. ........... 707/615 |
| 7,801,851 B2 | | 9/2010 | Holenstein et al. |
| 2002/0013846 A1 | | 1/2002 | Vuong et al. |
| 2002/0026603 A1 | | 2/2002 | LeCrone et al. |
| 2002/0133507 A1 | | 9/2002 | Holenstein et al. |
| 2002/0165724 A1 | * | 11/2002 | Blankesteijn ..................... 705/1 |
| 2003/0058277 A1 | * | 3/2003 | Bowman-Amuah .......... 345/765 |
| 2003/0187884 A1 | * | 10/2003 | Holenstein et al. ........... 707/202 |
| 2004/0044672 A1 | * | 3/2004 | Spencer, Jr. ................... 707/100 |
| 2004/0088702 A1 | | 5/2004 | Garthwaite et al. |
| 2004/0215668 A1 | * | 10/2004 | Sun ................................ 707/201 |
| 2006/0212493 A1 | * | 9/2006 | Aronoff et al. ................ 707/202 |

OTHER PUBLICATIONS

Astrahan et al., "System R: relational approach to database management". ACM Transaction, vol. 1 Issue 2, Jun. 1976. pp. 97-137.

Arcangeli et al., "An API for high-level software engineering of distributed and mobile applications"; Inst. de Recherche en Inf., Univ. Paul Sabatier, Toulouse; 2001; pp. 155-161.*

Eickemeyer, R. J., "A load-instruction unit for pipelined processors"; IBM Journal of Research and Development, Jul. 1993. vol. 37, Issue: 4; pp. 547-564.*

Graham et al., "Applying Method Data Dependence to Transactions in Object Bases" University of Manitoba, Canada. Jun. 1992. pp. 1-15.*

Sang Hyuk Son "Replicated Data Management in Distributed Database Systems" SIGMOD Record, vol. 17, No. 4, Dec. 1988, pp. 62-69.*

Maurice Herlihy, "A Quorum-Consensus Replication Method for Abstract Data Types" ACM 1986.*

Partial EP Search Report issued on Aug. 11, 2006, in EP Application No. 04015311.6, 6 pages total.

W. H. Highleyman, et al., "Breaking the Availability Barrier," 1st Books, 2003, Chapters 1, 3, 4 and 6.

* cited by examiner

Simple Data Replication Engine (PRIOR ART)

DATA REPLICATION
(DR) ARCHITECTURE

DATA REPLICATION (DR) ARCHITECTURE

Bi-directional Replication

DATA REPLICATION
(DR) ARCHITECTURE

Multi-Node Replication

Single-Threaded Replication Engine (PRIOR ART)

Single-Threaded Replication Engine with DOC
(PRIOR ART)

MULTI-THREADED DATA REPLICATION ENGINE

MULTI-THREADED EXTRACTOR

Rules- Based Extractor -
Separate End-to-End Threads

MULTI-THREADED EXTRACTOR

Rules- Based Extractor -
Common Comm/Applier Thread

MULTI-THREADED EXTRACTOR

Expected Ends

MULTI-THREADED EXTRACTOR

Expected Ends Across Multiple Nodes

INTER-TRANSACTION REFERENTIAL INTEGRITY

Transaction Serializing with Extractor Coordination

Use of a Transaction Serializer

Multi-Threaded Applier

Router with Referential Integrity

Multi-Threaded Applier

Routing from a DOC

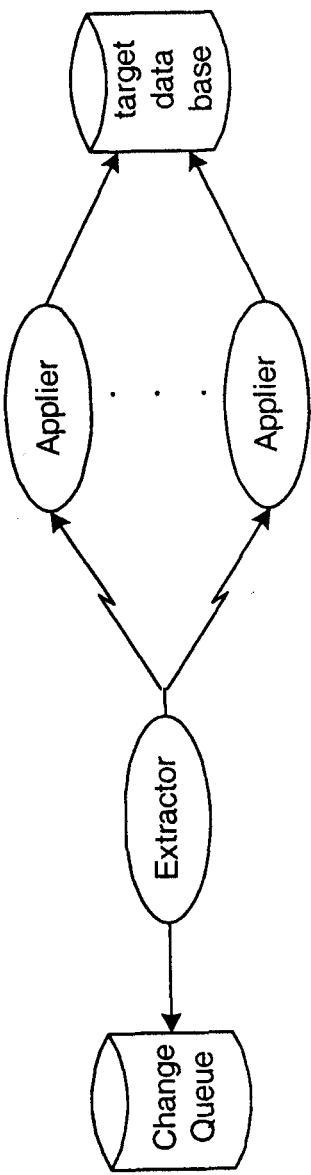

Multi-Threaded Extractor, Multi-Threaded Applier

METHOD FOR ENSURING REFERENTIAL INTEGRITY IN REPLICATION ENGINES BY SERIALIZING BASE LEVEL CHANGE QUEUE DATA

CROSS-REFERENCE TO RELATED APPLICATIONS

This application is a divisional of copending U.S. application Ser. No. 10/881,699 filed Jun. 30, 2004, which is incorporated herein by reference in its entirety.

This application claims the benefit of U.S. Provisional Application No. 60/484,473 filed Jun. 30, 2003 entitled "Methods for Building Survivable Systems in Enterprise Computing."

BACKGROUND OF THE INVENTION

The present invention relates to the field of data replication.

Significant reliability advantages for a large data processing system can be achieved if the system is broken into a network of smaller systems, each carrying a part of the processing load. This requires that the database copies across the network be kept in synchronization. One method for database synchronization makes use of asynchronous replication of database modifications from the database being changed (the source database) to the other copies of that database in the network (the target databases). If database changes are not applied to the target databases in the same order as they were applied to the source database, serious database inconsistency and corruption can occur. This is especially a problem if the data replication engines are multi-threaded so that database modifications flow from the source databases to the target databases over a multiplicity of independent paths. Various methods are described in the present invention which ensure that data replicated via multi-threaded replication paths do not result in replication-induced database corruption or inconsistency.

A. System Replication

As enterprises become more and more dependent upon their computing infrastructure, the continuous availability of these systems assumes an ever increasing importance. A powerful way in which to significantly increase a system's availability is to replicate it. That is, if an independent backup system is provided, one that can continue to provide data processing services in the event of a failure of the primary system.

There are many ways to replicate a system, as shown in FIG. 1:

a) Cold Standby: The backup system is not involved in the primary system's application unless the primary system fails. If this happens, the failed applications are loaded into the backup system so that processing can resume under the control of the backup system. Cold standbys are usually used with tape backup. Periodic snapshots (and perhaps more frequent updates) of the primary system's database are written to magnetic tapes which are held in safe storage. If the primary system fails, the backup tapes are retrieved from storage and loaded onto the backup system so that the backup system can resume processing. In some cases, the backup tapes are preloaded onto the backup system to shorten the recovery time from a primary failure.

b) Warm/Hot Standby: As is the case with a cold standby, a backup system is provided, one which is not normally involved in the primary system's application. However, all of the primary system's applications are preloaded in the backup system so that it is prepared to quickly take over in the event of a primary failure. In some cases, the applications may have the files open only for read access. In these cases, following a primary failure, the applications must reopen their files for full access before they can take over the processing functions of the primary system. This is called a warm standby. A hot standby has all of its files open for full access and is ready to take over immediately following a primary system failure. In either case, the standby system may be used for read-only activities such as query or reporting, but it is not updating the database.

c) Active/Active: In this architecture, both systems are actively running the same application and are sharing the processing load. If one node fails, application services continue to be provided by the surviving system without interruption except that total capacity has been cut in half.

d) Multi-Node: The active/active architecture can be extended to allow the application to run simultaneously on many processing nodes. If there are k nodes, then the failure of any one node will result in the loss of only 1/k of the total system capacity. For instance, the loss of one node of a four-node system will result in a 25% reduction in processing capacity.

The "availability" of a system is the proportion of time that it will be operational. Typical systems today have availabilities of 99% to 99.99%. It is common to measure availability in terms of "9s." A system with 99% availability has an availability of two 9s. A system with 99.99% availability has an availability of four 9s. In a 24-hour per day, 7-day per week operation, a system with two 9s availability will be non-operational more than eighty hours per year on the average. A system with four 9s availability will be down on the average less than one hour per year.

It can be shown that replicating a system (that is, adding a backup system) will double the 9s of the system. (See, W. H. Highleyman, B. D. Holenstein, P. J. Holenstein, Breaking the Availability Barrier, Chapter 1, The 9s Game, 1stBooks; 2003.) If k systems are provided, then the resulting application network will have an availability that is k times the number of 9s as a single system. For instance, if a single system has an availability of three 9s, providing a replicate system will increase its availability to six 9s.

There are many reasons to replicate a system, including:

1. to significantly increase the system's availability for its community of users.

2. to provide tolerance to natural or man-made disasters by separating the nodes by large distances so that such a disaster will affect only one node.

3. to allow maintenance or updating of the system one node at a time so that the application does not have to be taken down.

4. to provide locality of operations and data to user groups in the field.

B. Data Replication

Providing replicated processing capacity is only part of the requirement to replicate a system. In order for an application to function properly, it must generally have access to the database that represents the current state of the system (such as part levels for an inventory system, account balances for a banking system, and so forth). Therefore, the applications running on each node in a replicated system should have access to a current copy of the database, as shown in FIG. 1. Not only should the processing capacity be replicated, but the database should be replicated as well.

There are many ways to replicate a database, and each has its own characteristics with regard to recovery time following a failure and the amount of data that may be lost as a consequence of the failure. The means of data replication is chosen in part to conform to a company's tolerance for down time and data loss as determined by company objectives. These objectives are known as the Recovery Time Objective (RTO) and the Recovery Point Objective (RPO). See, W. H. Highleyman, B. D. Holenstein, P. J. Holenstein, Breaking the Availability Barrier, Chapter 6, RPO and RTO, 1stBooks; 2003.

1. Early Systems

In early replicated systems, a cold standby architecture was used; and data replication was predominantly via magnetic tape. Periodic copies of the primary database were written to tape, and that tape was transported to the backup system and used to update that system's database. Backup might typically have been undertaken daily or weekly.

A significant problem with this procedure was that a great deal of data was lost whenever the primary failed. The backup system had available to it a database that was perhaps hours or even days old.

This problem was alleviated by writing to magnetic tape the changes that were made to the database as the changes occurred. These changes could then be applied to the backup database by transporting the change tape to the backup system and by applying the changes to the backup database prior to activating the backup application.

Although less data now was lost, the recovery time for the application could be measured in hours or even days while the change tapes were transported to the backup site and loaded. Furthermore, if the change tapes were destroyed in the disaster, or if they proved to be unreadable, then all those changes were lost.

2. Asynchronous Replication

To solve the problems inherent with tape backups, real-time data replication engines were developed. These engines replace the magnetic tape with a communication network. As changes are made at the primary database, they are communicated in near-real-time to the backup system, where they are immediately applied to the backup system's database. The backup system is typically run as a warm or a hot standby.

Since database modifications are being applied to the backup independently of the source database modifications (and at some time later than the source updates), this is called asynchronous data replication. See, W. H. Highleyman, B. D. Holenstein, P. J. Holenstein, Breaking the Availability Barrier, Chapter 3, Asynchronous Replication, 1stBooks; 2003. Although this results in significantly less delay than data backup using magnetic tape, there is some delay from the time that a change is made to the primary database and the time that it is applied to the backup database. This delay is called "replication latency." Replication latency can be considered the time that it takes a change to propagate through the replication pipeline and to be applied to the target database. Changes in the replication pipeline at the time of a primary system failure will most likely be lost. However, this generally represents at most a few seconds of data; and recovery at a hot standby can be very fast.

3. Active/Active Applications

The fact that the backup system is now in near synchronism with the primary system allows active/active architectures to be implemented. That is, applications may be active in all nodes of the replicated system, with each application having available to it a nearly up-to-date copy of the database.

The terms "primary" and "backup" databases do not apply to active/active systems since, in effect, every database copy in the network is backing up every other database copy. Rather, databases are referred to as "source" and "target" databases. A change is applied to a source database and is replicated to one or more target databases, which can themselves be source databases updating other target databases.

4. Synchronous Replication

If exact database copies are required or if no data loss is tolerable in the event of a node failure, there are techniques available that will guarantee that all database copies are identical and that no data will be lost. These techniques are generally known as synchronous replication since all changes are synchronized across the network. See, W. H. Highleyman, B. D. Holenstein, P. J. Holenstein, Breaking the Availability Barrier, Chapter 4, Synchronous Replication, 1stBooks; 2003.

Synchronous replication techniques may be dichotomized into weak synchronous replication and strong synchronous replication. Strong synchronous replication guarantees that the modifications are in fact applied to the target database when they are applied to the source database.

Weak synchronous replication guarantees only that the changes included in a transaction have been received by the target site, but it does not guarantee that they have been applied to the target database. At this point, the source system is free to commit its transaction. However, there is no guarantee that the changes that are safe-stored by the target system can in fact be subsequently applied to the target database. If pending transactions at the target system are aborted after the source system has committed them, then the databases are no longer in synchronism.

There exist methods for coordinating commits across a network by using Ready to Commit (RTC) or Ready to Synchronize (RTS) tokens returned from the target node to the source node in response to a source node query indicating that the target node is ready to commit. (See, U.S. Published Patent Application No. 2002/0133507 (Holenstein et al.)). These tokens can also be used to implement weak synchronization by using them to respond to a source system query to inform the source node that all of the modifications required by a transaction have been received and/or have been safely stored but have not necessarily been applied to the target database. Whether using strong or weak synchronous replication, the source node's transaction can be allowed to complete once it has received this response from the target system.

Guaranteeing that database updates will be applied to the target database is also a problem with asynchronous data replication. In effect, weak synchronous data replication is a halfway step between strong synchronous data replication and asynchronous data replication.

Both strong and weak synchronous replication have performance issues which asynchronous replication does not have. Because each update must be coordinated among all copies of the database across the network, the application is slowed. The increased time that an application must take to provide this coordination is known as "application latency" and adds to the transaction response time.

Asynchronous replication does not affect transaction response time since the remote database updates are made without any application involvement. However, both asynchronous replication and weak synchronous replication may be subject to data collisions—described later—which strong synchronous replication avoids. Only the effects of asynchronous replication and weak synchronous replication are considered herein since there are generally no database consistency problems introduced by strong synchronous replication.

5. Physical Replication

There is another form of data replication which is mentioned here for completeness, and that is physical replication. Some systems will replicate data at the physical level. That is, whenever a disk block has changed or a time interval has expired on a changed block, that block is queued for transmission to the target system, where it is applied over the existing block at the target system. Physical replication has several limitations. They include:

a. If there is data corruption due to some fault at the source node, then the corruption will be replicated to the target node.

b. Physical replication ignores event and transaction ordering since blocks may not be sent in event order but according to some other algorithm. Similarly, the event order of changes within a block is not preserved.

c. Physical replication ignores transaction boundaries, so inconsistent views of the database may be quite common.

d. There is no guarantee that indices will match the base table data at any given point in time.

e. Physical replication does not support heterogeneous replication—both the source and target databases and systems must be the same or very similar.

f. A great deal of data that has not changed is sent over the communication line as part of each physical block.

On the other hand, physical replication can be much faster. It can play a role in unidirectional replication. However, since it provides no semblance of data consistency at the target database, it is hardly suitable for active/active applications and is considered no further herein.

6. Asynchronous Replication Issues

There are several issues associated with asynchronous data replication. First, as noted above, changes in the replication pipeline may be lost in the event of a source system or network failure. This data loss can be minimized by minimizing replication latency, and lost data is generally recoverable once the failure has been corrected (assuming that the source system has been recovered).

Second, the ping-ponging of changes in active/active applications must be avoided. Ping-ponging is the replication of a change received by a target system back to the source system. It is a form of data oscillation or data looping. There are techniques available for ping-pong avoidance, such as described in U.S. Pat. No. 6,122,630 (Strickler et al.). (Certain synchronous replication techniques are also subject to ping-ponging.)

Third, asynchronous data replication is subject to data collisions. Data collisions are caused by replication latency. Because there is a delay from the time that a change is made to the source system and the time that it is applied to the target system, there is a time interval during which the value of that data item at the target system is stale. That is, the value at the target system is incorrect. If an application at the target system change a stale data item, then it will replicate the resulting value to all other systems in the network at the same time that the original source item is being replicated. Each of these replicated values will be different, and each probably will be wrong. This is known as a data collision, and the database is now in an inconsistent state. Data collisions must either be detected and corrected, or they must be avoided. (See, W. H. Highleyman, B. D. Holenstein, P. J. Holenstein, Breaking the Availability Barrier, Chapter 3, Asynchronous Replication, 1stBooks; 2003, for a discussion of data collision detection and correction.)

Data collisions can be avoided in one of several ways. For example, the database can be partitioned such that each node owns a partition; and only the owner of a partition can change that partition. If this is done, data collisions will not happen. If, however, all nodes must be able to change all data items, then synchronous replication can be used to guarantee that all copies of a data item are changed before any copy can be further changed.

If data collisions cannot be avoided, then they can cause the database to be placed into an inconsistent state. A fourth problem with asynchronous data replication is that data collisions and other situations or configurations may cause the database to become inconsistent. These situations are said to violate the referential integrity of the database. Referential integrity and its violation situations are described in more detail later.

C. Definitions

The following definitions are provided to promote understanding of the invention. For clarity, the definitions are phrased with respect to a scheme that replicates only two databases. However, the scope of the invention includes schemes where replication occurs between more than two databases.

transaction—A transaction is a unit of work consisting of one or more individual steps and/or operations, collectively called the transaction data, to be applied to one or more local and/or remote databases as a single atomic unit of work. A characteristic of transactions is the requirement that either all steps and/or operations are applied or all are rolled back in the case of a problem so that the database(s) is always left in a consistent state. Transactions are often identified by a number or name called the transaction identifier. The transaction identifier is often, though not necessarily, unique. An example of an "individual step" would be to insert a record (row) into the database. An example of an "operation" would be the procedure which increases the price column of all rows in the database by 10%.

serialized data—in a replication system, this refers to the order the data changes are applied into the target database. The purpose of serializing the data is to avoid corrupting the target database (meaning the goal is to avoid ending up with the wrong records or values in the target data).

In its purest form, it is referring to preserving the order of the events both within a transaction, as well as the order of the events across all other simultaneous transactions. This "pure" form, sometimes referred to as the "natural flow of transactions", may not be attainable on many systems as the order the events are extracted from the change queue (even if they need to be further sorted) may not always be able to be re-ordered into this pure form, e.g. perhaps because the intra or inter-transactional order is not fully preserved, important, or recreatable. What is required for data serialization is that the order the transactions start, and/or end, whether they be committed or aborted, is recreatable for replay into the target database for "related" events.

re-serializing data—refers to re-ordering the data changes into a serialized order after the data has become unserialized, for example if multiple paths are used to deliver change data to a target system the data may need to be re-serialized before it is replayed.

related events—refers to whether the database change events refer to, or are otherwise dependent on, other events. For related events, with some specific exceptions, the order of replay should be serialized (if not during the replay, then at transaction end time).

Data (or database) constraints are generally used for preserving and enforcing the relationship of the related data. The concept of related data is often referred to as preserving the referential integrity of the data.

Events can be unrelated (which means replaying them in any order does not cause any corruption or data referential integrity issues), loosely-, or weakly-, related (which means that replaying them out of order can cause a perhaps brief referential integrity issue, but no corruption issues), and tightly-, or strongly-, related (which means that replaying them out of order will cause target database corruption).

An example of unrelated events would be records from different files or tables for different applications that have no relationship to each other—these could be replayed in any order provided they are all unrelated to each other.

An example of loosely related events would be the relationship for a customer name/address record to always exist for the purchase order header record(s) that refer to it. When loosely related events are replayed out of order, there can be brief periods of referential integrity violations, but these will generally self-correct over time as all the events are eventually replayed (i.e., when inserting a new customer record and the first purchase order for that customer, one can replay either first—in the end, both exist). Note that loosely related events can be made to be tightly related by turning on strict referential integrity checking in the target database such that the transaction is rejected if the referential integrity relations are not satisfied, at a minimum by commit time (database "constraints" are generally used for this purpose).

An example of tightly related events is when two updates in a transaction update the same record. If these updates are overlaying absolute values (i.e., replacing the contents of the target record or the same selected fields with the incoming value), these events must be replayed in the correct order (or only the last needs to be applied). Replaying them out of order will result in database corruption. Note that tightly related events can often be made to be loosely related by changing the updates from absolute values to relative values (i.e., for a numeric field, applying the mathematical difference between the original value and the new value rather than the absolute value, for example adding the update difference to the target record/field instead of replacing the target record/field value).

Data Collection/Log Techniques—Definition of Change Queue

The present invention includes many data collection techniques, not just the classic transaction monitor and transaction "redo"/"journal" log, or change queue or audit trail, approach defined and used by many commercial databases, such as ORACLE from Oracle Corporation, Redwood City, Calif.

The primary features of these data collection techniques are that they collect, retain, and serialize the database change activity. Some even provide transactional integrity (i.e., a set of database updates is either fully applied or fully undone). The collected data is saved in a "log" that may be disk-based, memory-based, an application log file, or other queue structure. The data may be stored in transient or non-transient storage. The present invention includes the following data collection techniques:

(1) Reading database "redo" logs. These logs are typically maintained by a transaction processing (TP) subsystem provided by the O/S or database vendor. They typically contain database "before" and/or "after" record images, as these images can be used to restore the before state of a record update (abort situation) or to apply the after state of a database update (commit situation). These monitors typically provide transactional database integrity. Access to these logs, and understanding the format of the data in them, is required to use this technique. Salient features include:
  a. The application and the replication engine are usually "loosely coupled" (i.e., they run independently, and can be independently tuned).
  b. The TP subsystem usually provides automatic redo log retention/management. The Compaq Transaction Monitoring Facility (TMF) provides this functionality on an NSK system.
(2) Reading database "image" logs. These logs are typically maintained by the application itself, and they contain similar information to the redo logs. The application may or may not provide transactional database integrity. Access to these logs, and understanding the format of the data in them, is required to use this technique. Salient features include:
  a. The application and the replication engine are usually "loosely coupled" (i.e., they run independently, and can be independently tuned).
  b. The application subsystem usually provides automatic image log retention/management.

The Tenera Plant and Information Management System (PIMS) application, commercially available from Tenera Inc., San Francisco, Calif., provides this functionality in the database "cradle" and log files.
(3) Using database triggers and/or stored procedures to perform the collection of the database change data, and saving the gathered data into a collection log. This technique requires that the database provide a trigger/stored procedure mechanism (or something similar) that is available to the replication engine. Salient features include:
  a. The application and the replication engine are usually "tightly coupled" (i.e., they run interdependently), at least for the data collection part.
  b. The replication engine must provide its own log retention/management.

The Shadowbase "open" collection environment (e.g., Solaris/Oracle, Windows/MS SQL Server, etc) offers this approach for capturing database change data for the replication engine.
(4) Using an "intercept" library that intercepts application disk I/O calls and saves the database change data into a collection file. This technique requires that the O/S and/or application environment provide an intercept mechanism that is available to the replication engine. Salient features include:
  a. The application and the replication engine are usually "tightly coupled" (i.e., they run interdependently), at least for the data collection part.
  b. The replication engine must provide its own log retention/management.
  c. The application must have the intercept library bound or linked into it (or similar technique). Typically, this requires no coding changes, as the intercept library intercepts the calls, saves the database change data, and executes the I/O (noting if it succeeded or failed).

The Golden Gate Extractor/Replicator product, commercially available from Golden Gate Software, Sausalito, Calif., provides this technique for event capture. The NTI DrNet product, commercially available from Network Technologies International, Inc., Westerville, Ohio, provides this technique for event capture.
(5) Using a "callable" library application-programming interface (API) that performs the application disk I/O on behalf of the application. The library performs the data collection similar to the method used by the intercept library. Salient features include:
  a. The application and the replication engine are usually "tightly coupled" (i.e., they run interdependently), at least for the data collection part.
  b. The replication engine must provide its own log retention/management.
  c. The application must have the callable library bound or linked into it (or similar technique). Typically, this requires application coding changes, as the application must call the API for all disk I/O.

The NetWeave product, commercially available from Vertex Interactive, Clifton, N.J., is an example of this technique.

communication channel—When the source and target databases being replicated are co-located, the communications channel(s) is generally a physical data bus, fabric, or local area network (LAN). When the source and target databases being replicated are geographically disbursed, the communication channel(s) is generally a wire or wireless communication medium, often as part of a wide area network (WAN).

communication network (or network)—a means allowing two or more processes or systems to interoperate with each other.

D. Transactions

Fundamental to database consistency is the concept of a "transaction." A transaction is a group of related changes that are managed in such a way as to maintain a database in a consistent state. That is, a view of the database at any time will always give a consistent result.

A simple view of the problem solved by the transaction concept can be obtained by considering a banking application that is managing a person's checking account and savings account. If $1,000 is to be transferred from his savings account to his checking account, then that amount must first be subtracted from the savings account and then added to the checking account (or vice versa). If the balances for these accounts are viewed in the middle of this process, then the savings account balance will be reduced by $1,000, but this money will not have shown up yet in the checking account. Even worse, if the system fails at this point, the $1,000 will be lost.

By using the transaction model, this problem is avoided. A transaction manager assures that either all changes within the scope of a transaction are made (the transaction is committed) or that none are made (the transaction is aborted, thus returning the database to its original state). Additionally, the transaction manager usually assures that intermediate states are not readable, generally by holding the updated records locked until the end of the transaction, so that any view of the database is always consistent.

Programmatically, the definition of a transaction's scope is often accomplished by framing the changes comprising a transaction by a Begin Transaction command and an End Transaction command (which may be either a commit or an abort command):

Begin Transaction

Change 1

Change 2

⋮

Change n

End Transaction

The transaction model has certain properties that are extremely important to database consistency. They are known as the ACID properties (see, Gray, J. et al.; Transaction Processing: Concepts and Techniques, Morgan Kaufman; 1993.):

Atomic—The transaction is an atomic entity. Either all changes are completely executed, or none are executed.

Consistent—Any view of the database at any time is always consistent. If a transaction is in process, one may see the pre-transaction data or be required to wait until the transaction completes, depending upon the system. But one will never see an intra-transaction inconsistent state. There is one common exception to consistency. Some database managers allow so-called "dirty reads"—the reading of locked data that may be in the process of being modified. Such reads may yield inconsistent results.

Isolated—The effects of a transaction are unaffected by other transactions that are being simultaneously executed.

Durable—The effects of a transaction survive system faults. There are many levels of durability. At the very least, the changed data must be written to a persistent storage device such as disk.

Furthermore, that data will survive a disk failure if the disk is replicated (mirrored disks or RAID—Redundant Arrays of Independent Disks). The data will survive a disk failure and a processor failure if the system is replicated.

Transactions can be effective across replicated systems with multiple copies of the database since the changes to each database copy may be included in the scope of the transaction. Thus, either all copies will be changed, or none will. Furthermore, the new data values at each copy will not be viewable until it is guaranteed that all copies have indeed been changed. This is synchronous replication, as discussed previously.

However, the transaction model loses some of its protective capabilities if asynchronous replication is used. This is because the replication process may spawn independent transactions at each database copy. There is no coordination between these transactions. They each guarantee the ACID properties within their own database, but there is no such guarantee across the network.

Specifically, the database may have periods of inconsistency due to data collisions described previously or due to referential integrity violations, as described later.

E. Simple Data Replication Model

The basic components of an asynchronous data replication engine are shown in FIG. 2. There are three components in this simple model.

1. An Extractor that is responsible for obtaining changes that have been made to the source database.
2. An Applier that is responsible for applying changes to the target database (the Applier can, in fact, be part of the same component that contains the Extractor).
3. A communication channel that is used by the Extractor to send database changes to the Applier and to receive acknowledgement, control, and status information from the Applier.

As shown in FIG. 2, the Extractor may obtain source database changes in any one of several ways. They include:

a) The application program generating the changes may queue change information for the Extractor to read. Though this queue may be memory-resident, it is usually written to a persistent store such as a disk-resident Change Log so that the changes are preserved in the event of a source system failure. (Note: The term "disk" will be used solely for convenience hereafter and is to be interpreted as "persistent storage.")

b) The transaction manager may create an Audit Trail on disk of all changes made to the database for the Extractor to read. The Audit Trail may comprise several disk volumes, such as a Master Audit Trail and one or more Auxiliary Audit Trails.

c) A change to the database may activate a database trigger, stored procedure, publish/subscribe facility, or similar function that will queue the change to the Extractor. Although this queue may be memory-resident, it is usually written to a disk-resident Database of Change (DOC) file for durability purposes in the event of a source system or network failure.

This simple data replication model is easily extended to bi-directional and multi-node data replication by using multiple data replication engines, as shown in FIG. 3. It may also be extended to provide synchronous replication by adding a facility to coordinate the commits by the various replication engines across the network, for example using the well-known two-phase commit (2PC) protocol. Note that in a multi-node network, there need not be a connection between every node so long as each node has a path to all others. Also, there need not be a database resident at every node. Some nodes may have a partial database or no database at all; instead, they access data from other nodes. Data replication engines may only be needed at those nodes that have a partial or full database copy.

F. Natural Flow

In the simple data replication model shown in FIG. 2, the replicated entity may either be a single data item change or a transaction. If changes are being replicated, then as each change is received by the Extractor, it is sent to the Applier and applied to the target database. Of course, these changes may be buffered or blocked to improve efficiency. If transactions are being replicated, then in a similar manner each begin transaction, set of changes, and end transaction are given to the Extractor as they occur and are sent to the Applier for application to the target database as a transaction.

The form of changes sent down the replication pipeline can vary from one data replication engine to another. Some will send after images of a row or record. Others will send just field or column changes within a row or record. Still others will send the operations or functions to be applied to a specific set of rows, records, fields, or columns or will send only the relative difference represented by the changes. Row, record, field, or column before images are often sent as well. Before images are useful to determine if a data collision has occurred by comparing the source before image to the current target image. Before images can also be used to back out modifications made by a transaction that is subsequently aborted.

In the simple model of FIG. 2, the database change events at the source database are applied to the target database in precisely the same order. Thus, the target database represents an exact copy of the source database as it transitions through its various states, albeit delayed by the replication latency. Although the replication channel may be single-threaded, transactions may be interleaved as they were at the source system.

This simple model preserves the natural flow of changes or transactions occurring at the source database as they are being applied to the target database. (See, Knapp, H. W., The Natural Flow of Transactions, ITI White Paper; 1996.) The requirement to adhere to strict event sequence can be relaxed if events are not related. It can also be relaxed if database consistency is not checked until transaction commit time rather than upon each update. In this case, changes within a transaction can be applied out of order so long as database consistency is satisfied at commit time (of course, changes to the same record or field that occur in a transaction still need to be applied in the same order). These characteristics are taken advantage of in some of the architectures which follow.

If the natural flow of transactions is not preserved at the target database, then the database can become corrupted. This may occur for a variety of reasons. For instance, one transaction may set the value of a data item to 10. A subsequent transaction may set the value of that same data item to 20. If these transactions are applied in opposite order at the target database, then the data item will be left with a value of 10, which is wrong. The database is now corrupted.

A similar problem can happen even if the natural flow of transactions is preserved, but the change order within a transaction is not preserved. Corruption will occur if multiple operations within the transaction are not commutative—that is, the result of these operations depends upon the sequence in which they are executed. The simplest case is when the replication engine is sending changed images of rows, records, fields, or columns. In this case, if multiple changes have been made to a field or column or even to a row or record, an older image may overwrite a newer image if they are not applied in the correct order and will leave the database in an incorrect state.

A more subtle case occurs when only change operations are sent or are computed before the changes are applied. These operations are often commutative and can be applied in any order. But consider a data item A, which is to be modified by adding data item B to it and then multiplying the result by data item C:

$$(A+B)C \rightarrow A$$

If natural flow is not preserved, and if the multiplication is made before the addition, the result is $$AC+B \rightarrow A$$

This is not the desired result. As will be demonstrated later, more complex data replication models may not inherently preserve natural flow. Such systems can cause database corruption unless special measures are taken to restore the natural flow prior to updating the target database. (There are some system implementations which do not care about database consistency unless there is a failover. In this case, the backup system will fix the database inconsistencies before taking over the processing load. These implementations do not support active/active applications.) The purpose of the discussion here is to describe various measures to maintain natural flow. The net result is concisely summarized by the following statement:

Database changes generally must be applied to the target database in natural flow order to prevent database corruption.

G. Referential Integrity

Referential integrity is another property of a database that must be preserved in order for the database to be correct. A database often comprises a complex network of references between the various records or rows stored in its files or tables. It is generally of paramount importance that when a reference is made to a record or row (or a field thereof), the referenced record or row actually exists and that the referenced entities are logically consistent (e.g., an accumulator value in one record or row equals the sum of the individual values in its referenced or referencing rows or records). Otherwise, the application may not be able to function correctly or may not be able to function at all. These references are sometimes known as "foreign keys" or "foreign relationships." All foreign keys must be resolved in order to satisfy referential integrity.

FIG. 4 gives an example of the requirement for referential integrity. It shows an order processing database. An order is represented in the database by an Order Header row and one or more Order Detail rows. The Order Header row contains the order number and customer id for the order.

Each Order Detail row contains the order number and the part number and quantity required by the order for a particular part. Each part is represented in the database by a Part row that contains the part number, its price, and the quantity in stock.

Finally, there is a row for each customer; this row contains the customer number, contact information, and so forth.

In order to create and process an order, each Order Detail row must have access to its Order Header, which identifies the customer, and must also have access to its Part row to obtain pricing and availability information. In addition, the Order Header must have access to its Customer row in order to confirm the order and to send an invoice.

If the target row of any of these references, or foreign keys, does not exist, then the order cannot be processed. For instance, FIG. 4 shows that the Part row for the second Order Detail row cannot be found. Therefore, the price and availability for this part cannot be determined; and either the order cannot be processed or can only be partially processed.

The existence of a target for every reference satisfies one of the conditions for referential integrity. If a reference is missing, the database has suffered a referential integrity violation. This is a foreign key that can not be resolved.

The record or row that is making the reference is known as the child. The record or row being referenced is the parent. A requirement for referential integrity, therefore, is that a parent must exist before its child is created; and a parent cannot be deleted until all of its children have been deleted.

There are also other application-specific constraints that may be violated if natural flow is not preserved. Ensuring that account balances do not become negative is one example. For instance, if one transaction adds an amount to an account, and if a second transaction debits that account, applying these transactions in the wrong order may result in a negative balance which may cause the debit transaction to be rejected at the target system even though it was accepted at the source system. This will not happen if natural flow is observed at the target system, nor will it happen if referential integrity is turned off at the target system.

Compressed audit trails may also cause referential integrity problems by interrupting natural flow. For instance, a change to a text field may just be recorded in the audit trail as the changed characters and a positional offset. In order to update the target row, the entire field or row must often be reconstructed. One way to do this is to apply the changed characters at the appropriate point to the target record or row. This works if the source and target databases have the same or similar structure but can be a difficult if not impossible mapping task if the database structures are different.

Alternatively, the current source row can be read and replicated in addition to, or instead of, the compressed data and then applied to the target database. However, the contents of the source row may have changed in the meantime. Although the target result should be correct after some later point in time, natural flow may be violated if the source row contents corresponding to the change are not replicated along with the change.

The above examples show the importance of maintaining inter-transaction dependencies. It may also be important to maintain intra-transaction dependencies if referential integrity is checked upon each data item modification. Otherwise, the reversal of a debit and a credit or the reversal of a parent/child creation may cause transaction rejection due to referential integrity checks.

In addition, for purposes of this discussion, referential integrity requires that the ACID properties of transactions be maintained.

Thus, for purposes of the discussion herein, referential integrity is taken to mean the strongest form of referential integrity and includes the requirements that all foreign keys are resolved, that intra- and inter-transaction dependencies are preserved, and that there is no violation of the ACID properties of transactions. In certain cases, as will be shown later, some of these restrictions can be relaxed if they do not affect database consistency or they can be violated during transaction replay as long as the referential integrity is ultimately preserved after the transaction(s) that violated them completely terminate.

In the simple data replication model of FIG. 2, the natural flow of changes and transactions is preserved. Therefore, the same level of referential integrity enforced at the source database will also be provided at the target database. If it is desired to have a higher level of referential integrity at the target database, then business rules can be incorporated into the Extractor, the Applier, or both to reorder transactions or events to provide this. This is especially important if the target system supports a stronger level of referential integrity than the source system, providing that that level of referential integrity is turned on at the target system.

Referential integrity may be enforced at the database level, depending upon the database being used. In fact, it may be enforced as each change is made; or it may be enforced only at transaction commit time. In the latter case, a change may violate referential integrity so long as the violation has been corrected by commit time. The enforcement of atomic changes (all or none) is usually an intra-transaction function, whereas the enforcement of other referential integrity criteria may be either an intra- or an inter-transaction function.

Thus, full referential integrity at the target database can only be guaranteed if natural flow is followed:

Related database changes must be applied to the target database in natural flow order to maintain referential integrity.

H. Current Data Replication Architectures (State of the Art)

There are several data replication architectures currently being used. Many of these are shown in FIGS. 5a, 5b, and 5c. To simplify the following descriptions, the Audit Trail, DOC, and/or Change Log will be referred to generically as the Change Queue.

1. Single-Threaded Replication Engine

FIG. 5a shows a basic single-threaded replication engine that was described earlier. Since all changes are sent to and applied to the target database in the same order as they were applied to the source database, then full natural flow order is maintained, at least so far as it was maintained in the Change Queue.

One complication with this model is that since all events are replicated, even those changes associated with transactions that are subsequently aborted are replicated and applied. The replication engine must have a means to remove these aborted transactions from the target database. This is typically done by the replication engine aborting the transaction at the target database, by applying the before images or undo events to the target database, or by the target system's transaction monitor performing similar tasks.

2. Single-Threaded Replication Engine with DOC

The abort complication with single-threaded replication engines is removed if a Database of Change (DOC) is used to buffer changes at the source or target system before they are applied to the target database, as shown in FIG. 5b. The replication engine can now select from the DOC only those transactions that have committed and can apply them to the target database. Aborted transactions are ignored. However, replication latency—the time that it takes for an update to the source database to propagate to the target database—has been lengthened by the extra storage step of transactions having to pass through the DOC intermediate storage.

Also, to preserve transaction natural flow, the replication engine will generally apply just one transaction at a time from the DOC. This can have a negative performance impact due to the lack of database update parallelism and is especially harmful if very long transactions can block shorter transactions which follow them. For instance, consider a large transaction that updates 10,000 records and a following short transaction with one update that commits just after the first transaction commits. It may take several minutes for the first transaction to be applied to the target database once it commits at the source database. The commit at the target of the following small transaction will be delayed these several minutes as it waits for the large transaction to complete. Furthermore, though processing load was typically level at the source system, the target system will suddenly experience a peak processing load when the large transaction is replayed. This makes tuning the target system extremely difficult.

As noted above, the DOC can either be on the source system or on the target system. The advantage of placing it on the source system is that it can provide transaction retention if the network or target system fails. However, in this case, once the problem is corrected, not only will the target system be heavily loaded during the large transaction replay, but so will the communication line. Furthermore, following transactions are now delayed not just by the processing times of the large transaction's updates, but also by the transmission time of these updates across the communication channel. Additionally, if the source system is lost in a disaster, all of the DOC data is lost as well. The net result of all of these delays is an increase in the amount of data that may be lost if the source system fails.

Note that with a DOC, pure natural flow is not followed since the modifications included within a transaction will not be applied to the target database until the transaction has committed. However, all change events within each transaction will be applied in natural flow order; and transactions themselves will be applied in the correct order with respect to each other. It is just that transactions are not necessarily interleaved as they are at the source system.

3. Multi-Threaded Replication Engine

Both of the above architectures have a performance limitation because they are single-threaded. That means that there is only one replication channel over which all database changes must flow or only one Applier that can be updating the target database at a time. In addition, if a DOC is used, the transactions themselves are generally applied one at a time. Without the DOC, the applying of transactions to the target database can be done in such a way that several transactions are active at a time, just as they were at the source system.

Some replication systems today use multiple threads to significantly enhance the capacity of the replication channel, such as the RDF product from HP of Cupertino, Calif. This is shown in FIG. 5c. In such an architecture, there are multiple replication channels over which changes can be sent from one or more Change Queues through (optionally) one or more DOCs or equivalent to the target database. Of course, if nothing is done to correct it, there is no semblance of natural flow at the target database because related I/O's, e.g., those for the same record and/or file or that are part of the same transaction, are not sent down the same replication path or otherwise coordinated at the apply side to guarantee they are applied in the correct order as part of the same transaction mix as was used at the source. In these state of the art systems today, changes across the replication paths are made in arbitrary order, and the database will typically not be in a consistent state.

Multi-threaded architectures are typically used for unidirectional data replication for system backup. If the source system fails, the target replication engine must first go through the database and make it consistent. This involves completing any transactions that it can and then aborting all transactions that have not completed. Since the unstructured update of the target database usually means that transaction boundaries are also not ordered properly, this can be a complex and timely process.

This architecture, of course, cannot be used in an active/active environment. Often, however, the target system is used for query and reporting purposes. It is important that the users understand that they are working with an inconsistent database and that the results of a query or report may be meaningless or nonsensical.

Multi-threaded replication engines can provide significantly improved performance in active/active applications, however, and will result in a consistent target database if care is taken to re-serialize change events into natural flow order prior to applying them to the target database. The remainder of this specification discusses techniques for doing just this.

I. Background Summary

Maintaining a consistent and uncorrupted database at all nodes in a replicated system network is of paramount importance if the distributed applications are to work properly. When using asynchronous replication, database consistency and integrity can be compromised in several ways:

a) Data collisions may give different views of the database at different nodes, thus corrupting the database.

b) If changes within a source transaction are not applied as an atomic entity, the database may not be in a consistent state until all of the changes have been applied.

c) If changes or transactions are made in a different order at different nodes, the value of a data item may vary at different nodes and may lead to a corrupted database.

d) If changes or transactions are made in a different order at different nodes, then referential integrity may be violated.

In the simple model of FIG. 2, the data replication engine preserves transaction boundaries and natural flow so that corruption types b), c), and d) will not occur. Data collisions may still occur if replication is asynchronous, although there are techniques to detect and resolve data collisions as described in W. H. Highleyman, B. D. Holenstein, P. J. Holenstein, Breaking the Availability Barrier, Chapter 3, Asynchronous Replication, 1stBooks; 2003.

However, more complex data replication models do not necessarily preserve either natural flow or transaction boundaries and may be subject to any of these corruption mechanisms. In those cases which are important to the application, there must be a mechanism to serialize events and/or transactions prior to their being applied to the target database, or at a minimum prior to any record locks being released for the target transactions. Much of the following discussion examines techniques for event and transaction serialization.

In the following discussion, it is assumed that the data replication engine is asynchronous or weakly synchronous. The focus is on the prevention of database corruption in complex data replication engines due to improper ordering of changes or transactions (corruption types b), c), and d)). These are the examples of the corruptions that can occur when natural flow is lost.

BRIEF SUMMARY OF THE INVENTION

One embodiment of the present invention provides schemes for replicating transaction data from a source database to a target database wherein the transaction data is communicated from a change queue associated with the source database to the target database. In one scheme, one or more multiple paths are provided between the change queue and the target database. The one or more multiple paths cause at least some of the transaction data to become unserialized. At least some of the unserialized data is reserialized prior to or upon applying the originally unserialized transaction data to the target database. In another scheme, the source database spans multiple nodes and the change queue receives transaction data posted at all of the nodes. The aggregate of at least some of the transaction data output from the change queue is unserialized. At least some of the unserialized data is reserialized prior to or upon applying the originally unserialized transaction data to the target database.

Another embodiment of the present invention provides schemes for processing base level data of a change queue that is not serialized at the logical level. The base level change queue data is transaction data previously posted to a source database. In one scheme, a logical replication engine is provided to replicate and post the change queue data to a target database in the order that the transaction data is stored in the change queue. Upon detection in the logical replication engine of change queue data that is not serialized at the logical level, the change queue data is reserialized at the logical level before the logical replication engine applies the change queue data to the target database. In another scheme, the logical replication engine replicates the change queue data that is not serialized at the logical level to a target database. The change queue data is then posted to the target database using asynchronous database access.

Another embodiment of the present invention provides a scheme for replicating transaction data from a source database to a target database. The transaction data is communicated from a change queue associated with the source database to the target database. An initial path having a maximum transaction load capacity is provided between the change queue and the target database for transaction data to flow. It is detected as to whether the current transaction load is close or equal to the maximum transaction load capacity of the initial path, and, if so, another path is provided between the change queue and the target database.

Another embodiment of the present invention provides a scheme for replicating transaction data from a source database to a target database. An applier is associated with the target database and the applier has a maximum transaction threshold limit. The applier normally posts transaction data to the target database only upon receipt of a commit step or operation associated with respective transaction data. In the scheme of the present invention, it is detected as to whether the maximum transaction threshold limit of the applier has been reached. If so, then a premature commit step or operation is conducted on at least some of the transaction data in the applier, thereby causing the transaction data to become posted to the target database and deleted from the applier.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings:

FIGS. 11a-11d show sample data replication engine configurations in accordance with preferred embodiments of the present invention.

DETAILED DESCRIPTION OF THE INVENTION

Figure 1A:
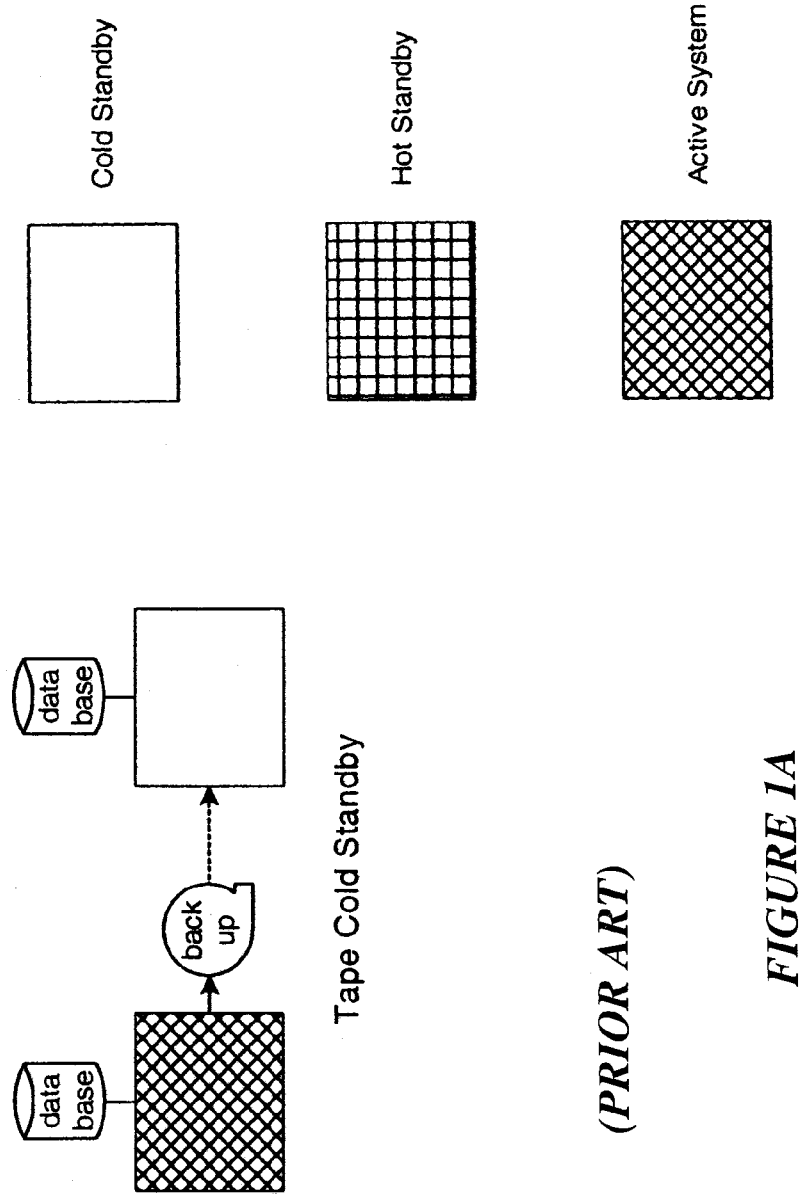
FIGS. 1a-1e show prior art system replication architecture.
Figure 1B:
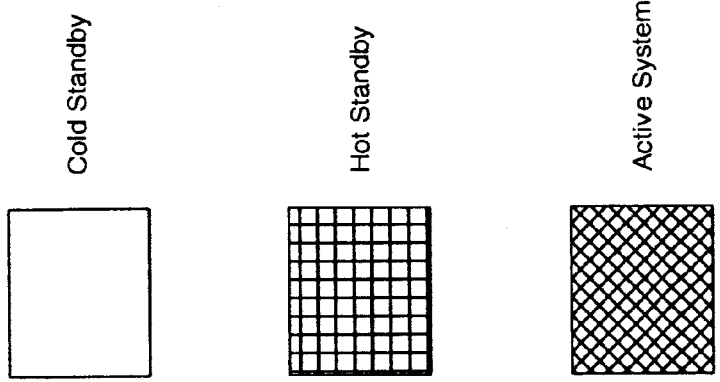
Figure 1B:
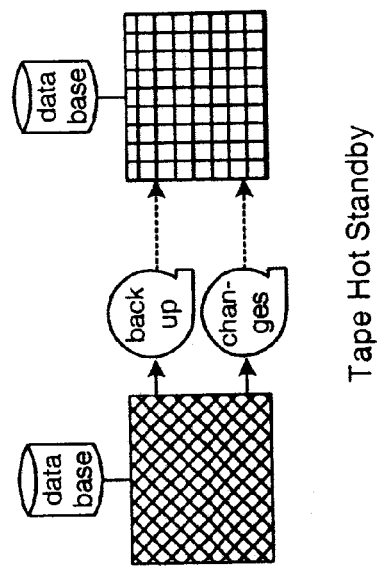
Figure 1C:
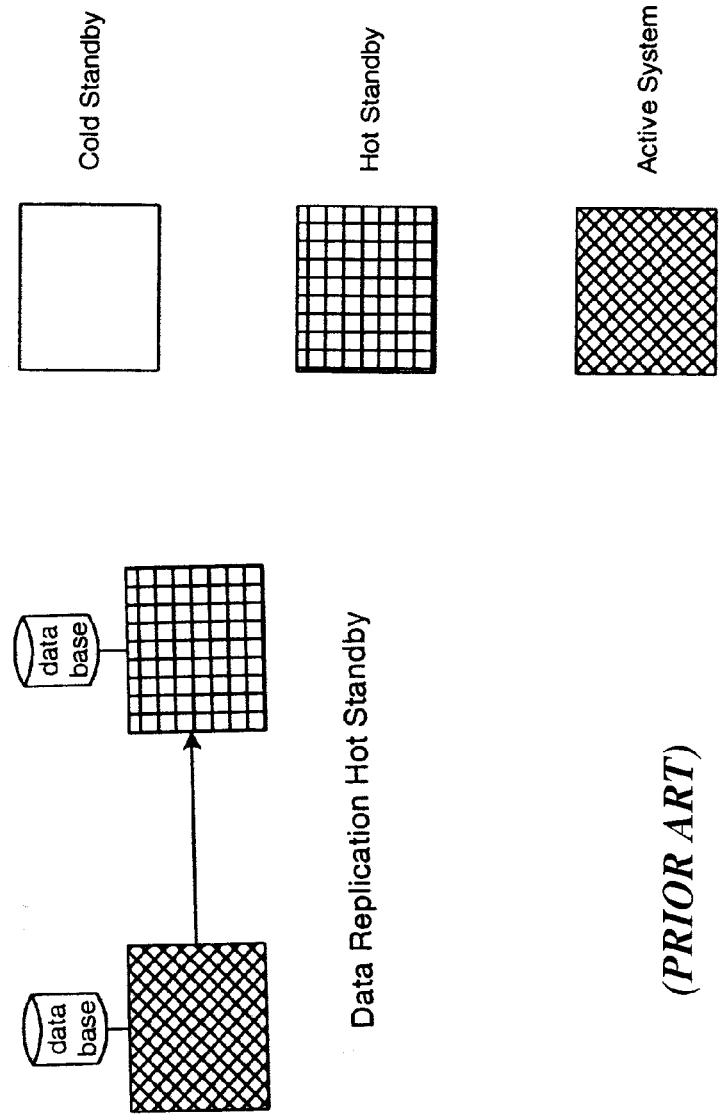
Figure 1D:
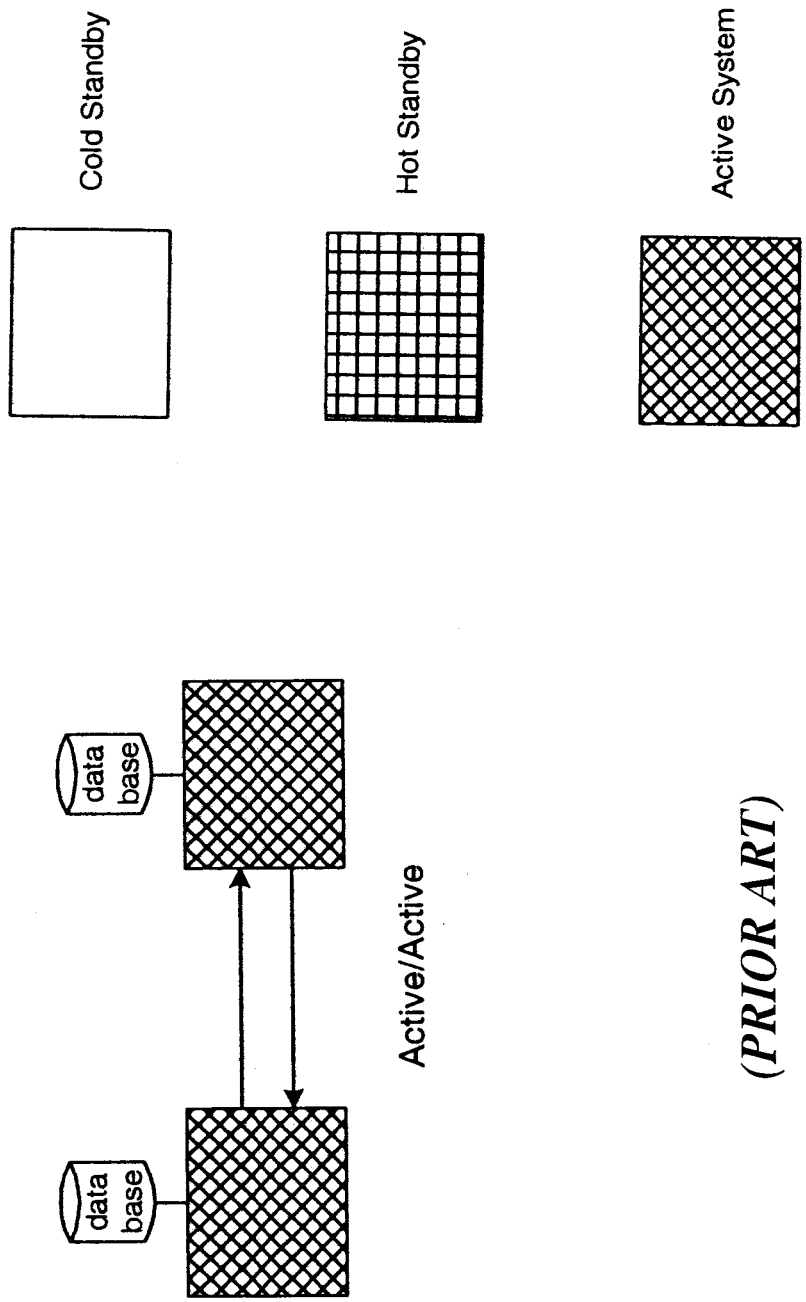
Figure 1E:
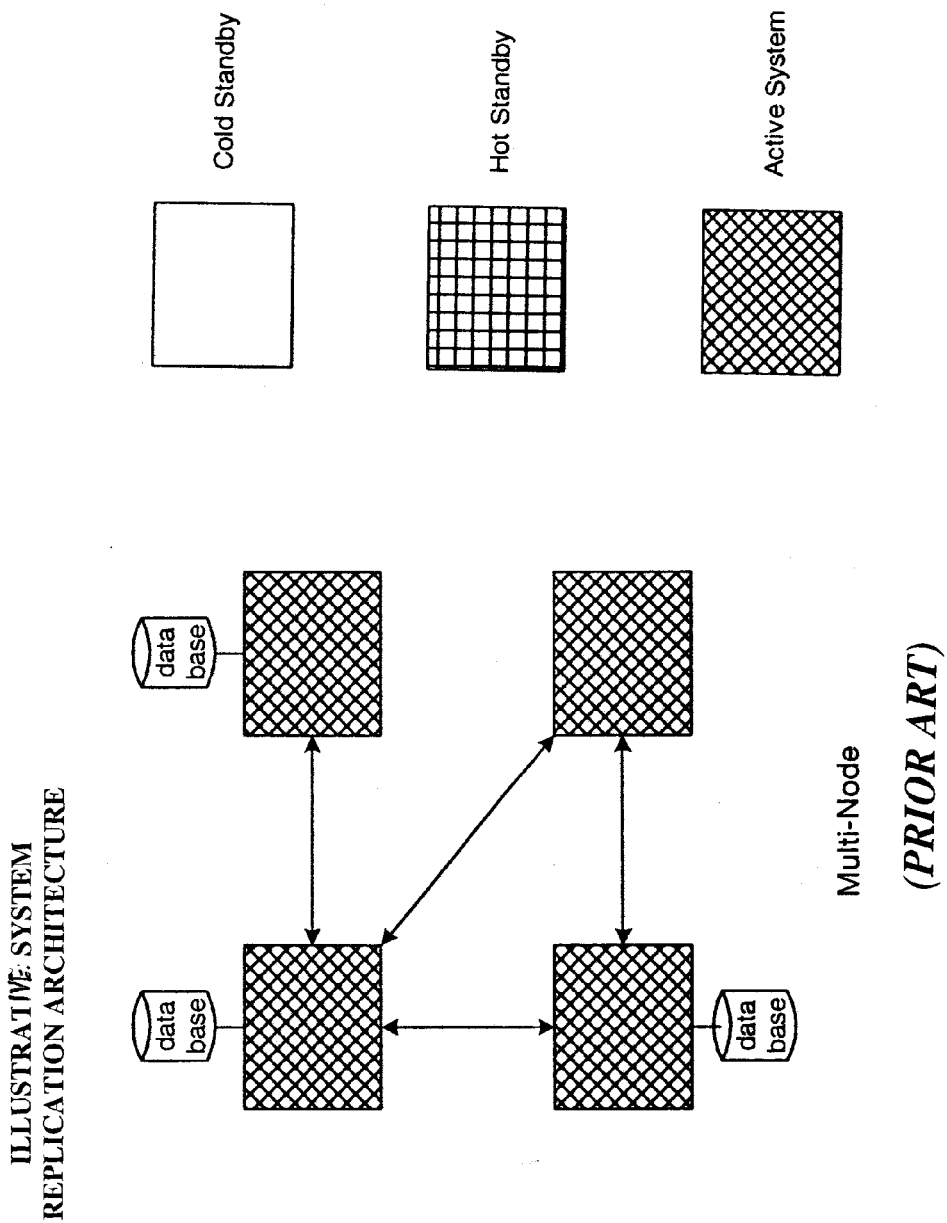

Certain terminology is used herein for convenience only and is not to be taken as a limitation on the present invention. In the drawings, the same reference letters are employed for designating the same elements throughout the several figures.

A. Multi-Threading for Performance

Figure 2:
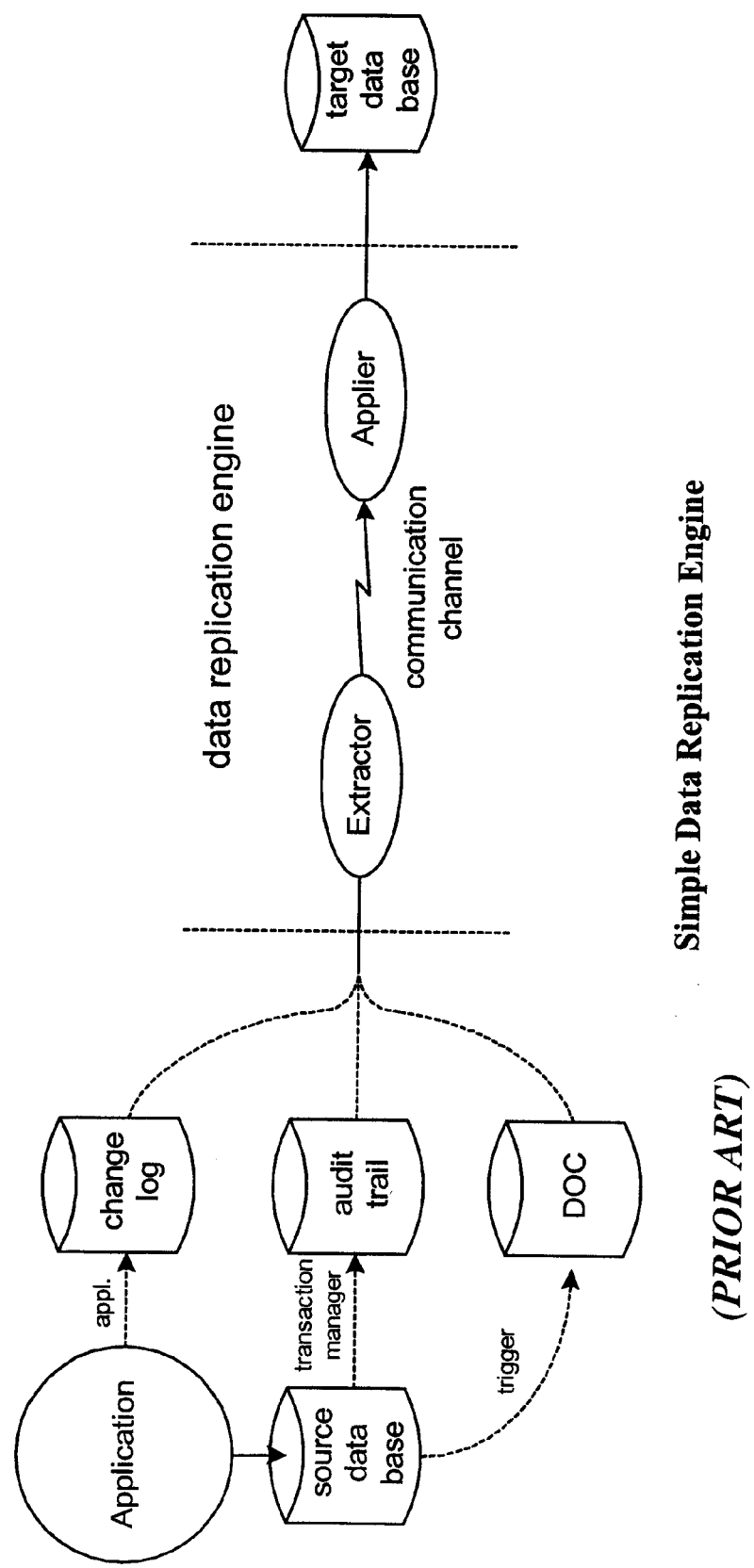
FIG. 2 shows a prior art data replication engine.
Figure 3A:
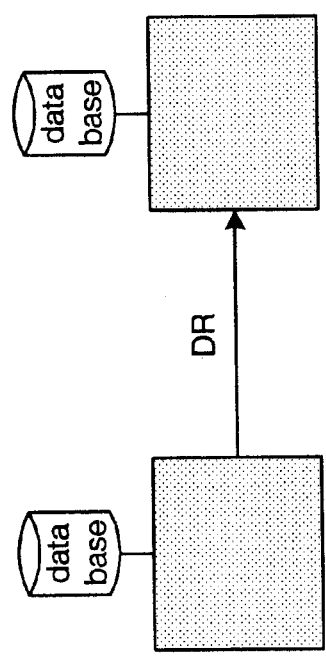
FIGS. 3a-3c show prior art data replication architectures.
Figure 3A:
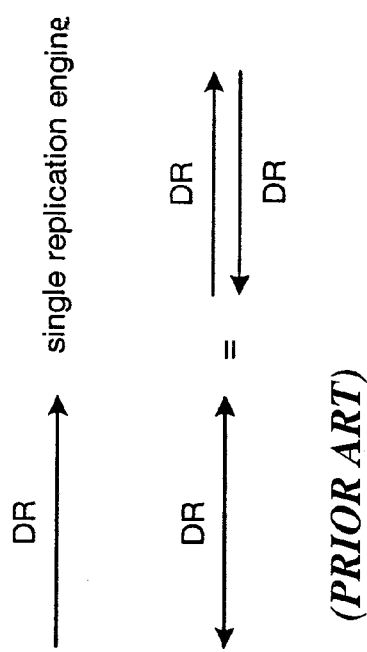
Figure 3B:
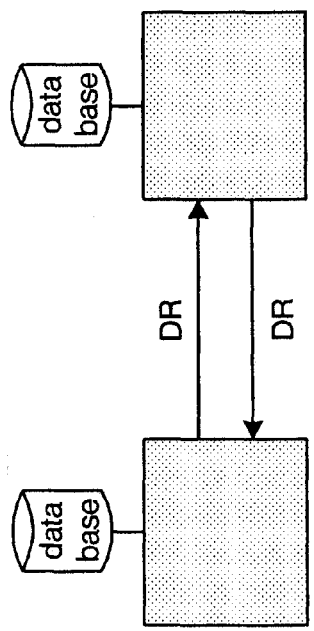
Figure 3B:
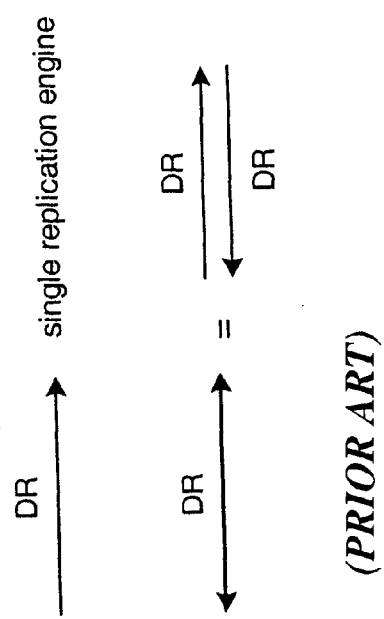
Figure 3C:
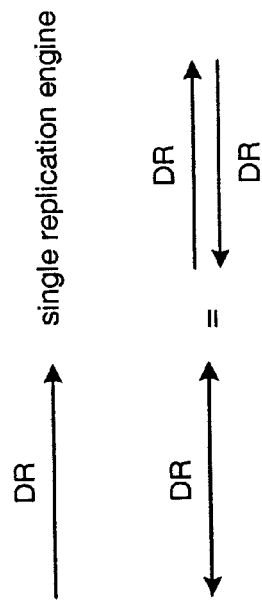
Figure 3C:
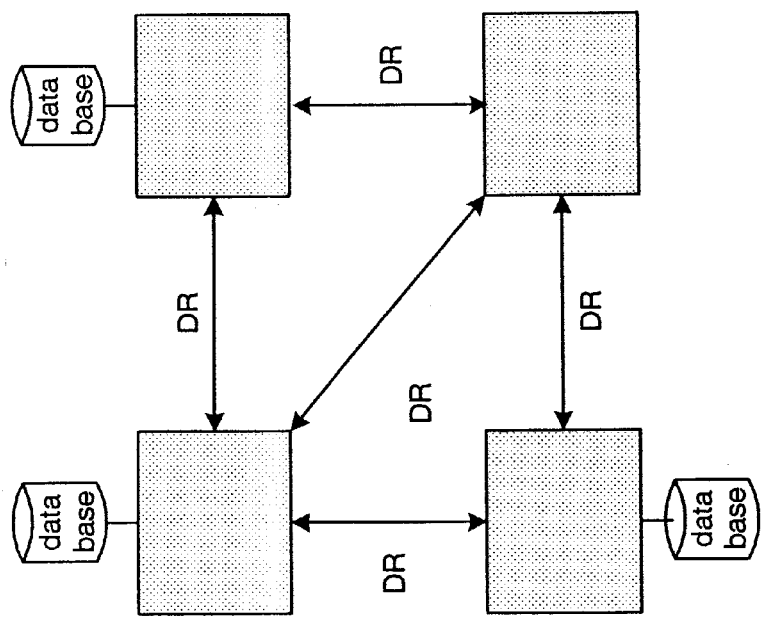
Figure 4:
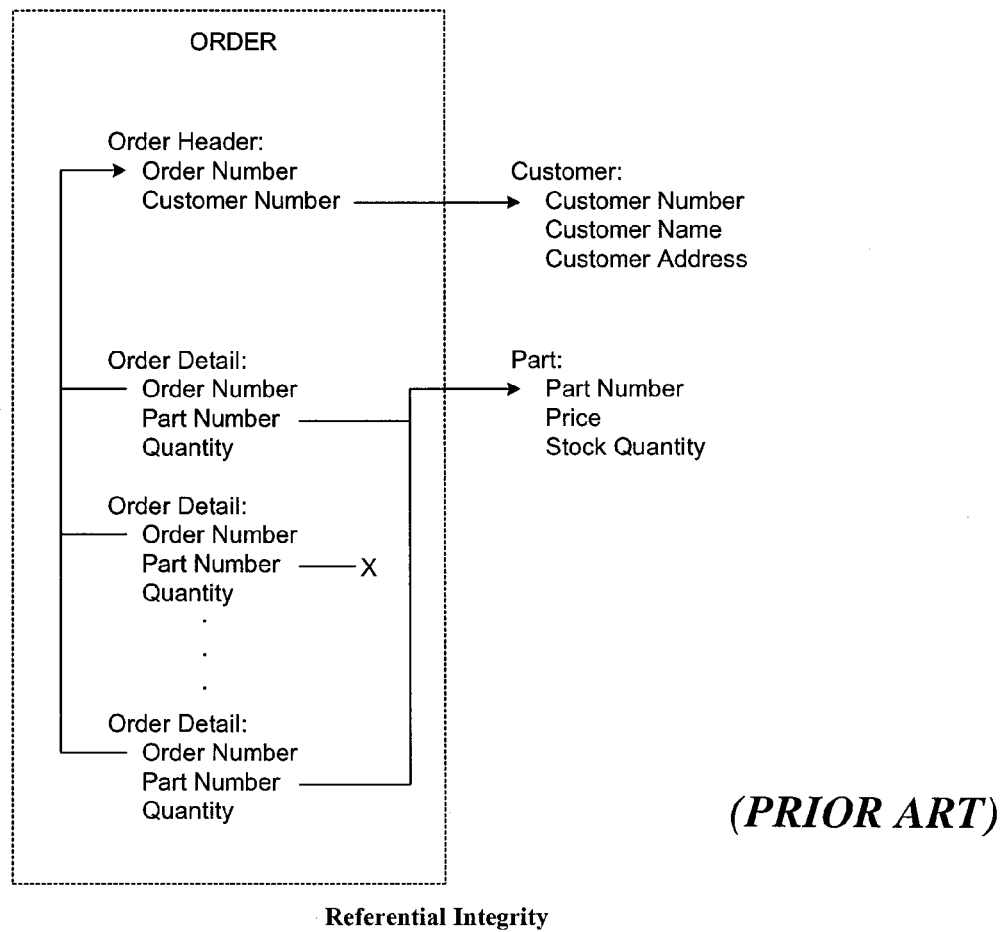
FIG. 4 shows a prior art order processing database.
Figure 5A:
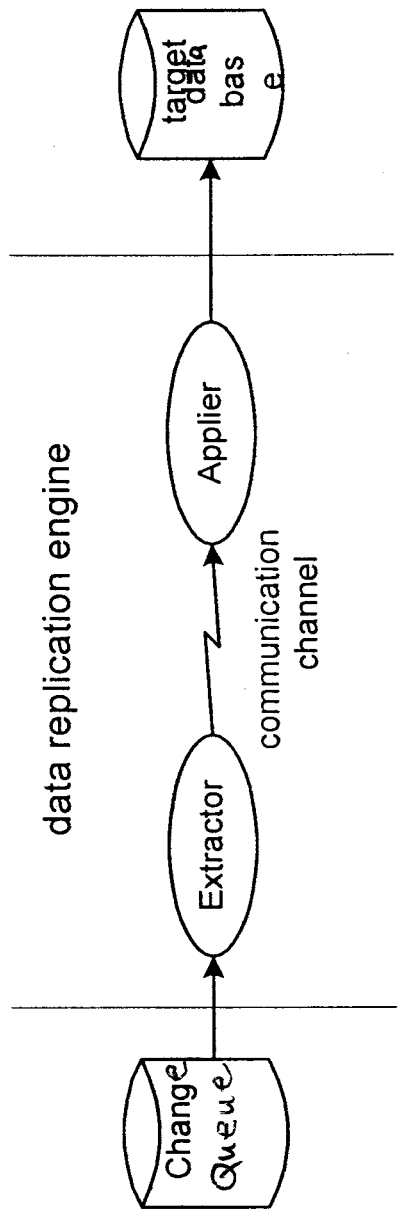
FIGS. 5a-5c show prior art data replication models.
Figure 5B:
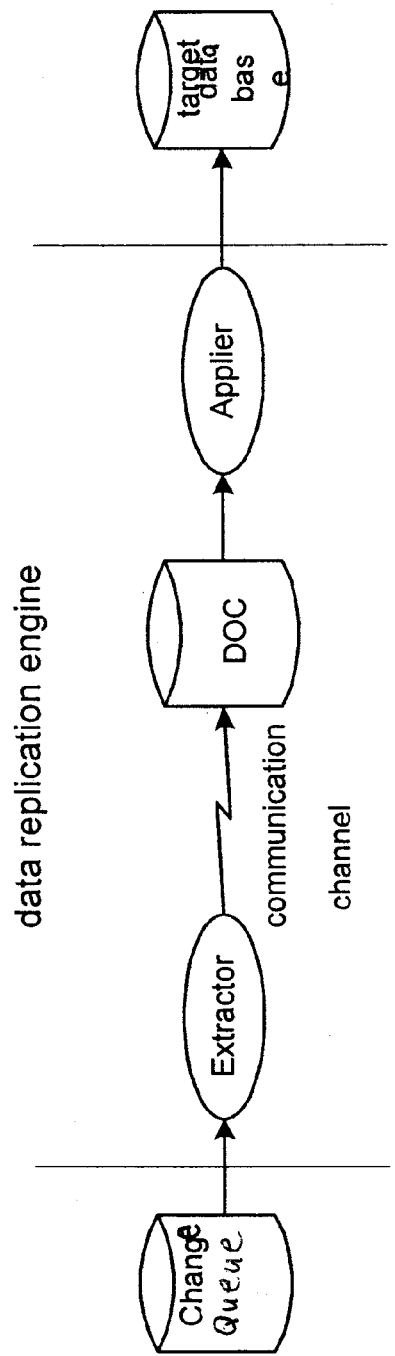
Figure 5C:
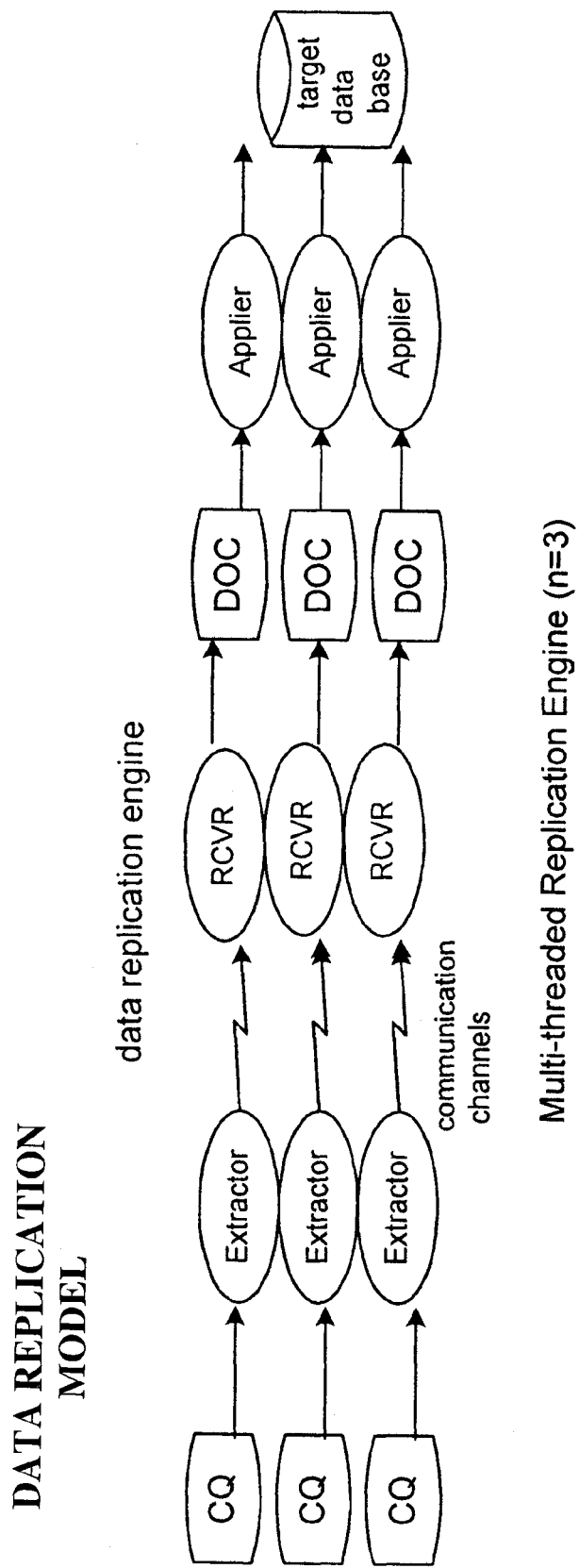

Transaction processing systems today can have transaction rates which are far in excess of what the simple data replication engine of FIG. 2 can handle. One solution to this is to multi-thread the replication engine. Multi-threading means that multiple parallel paths are provided for data item modifications or transactions to flow from the source database to the target database. In some software models, a thread manager is provided to manage several threads within one process. In other models, threads are implemented as similar processes running in parallel.

Figure 6A:
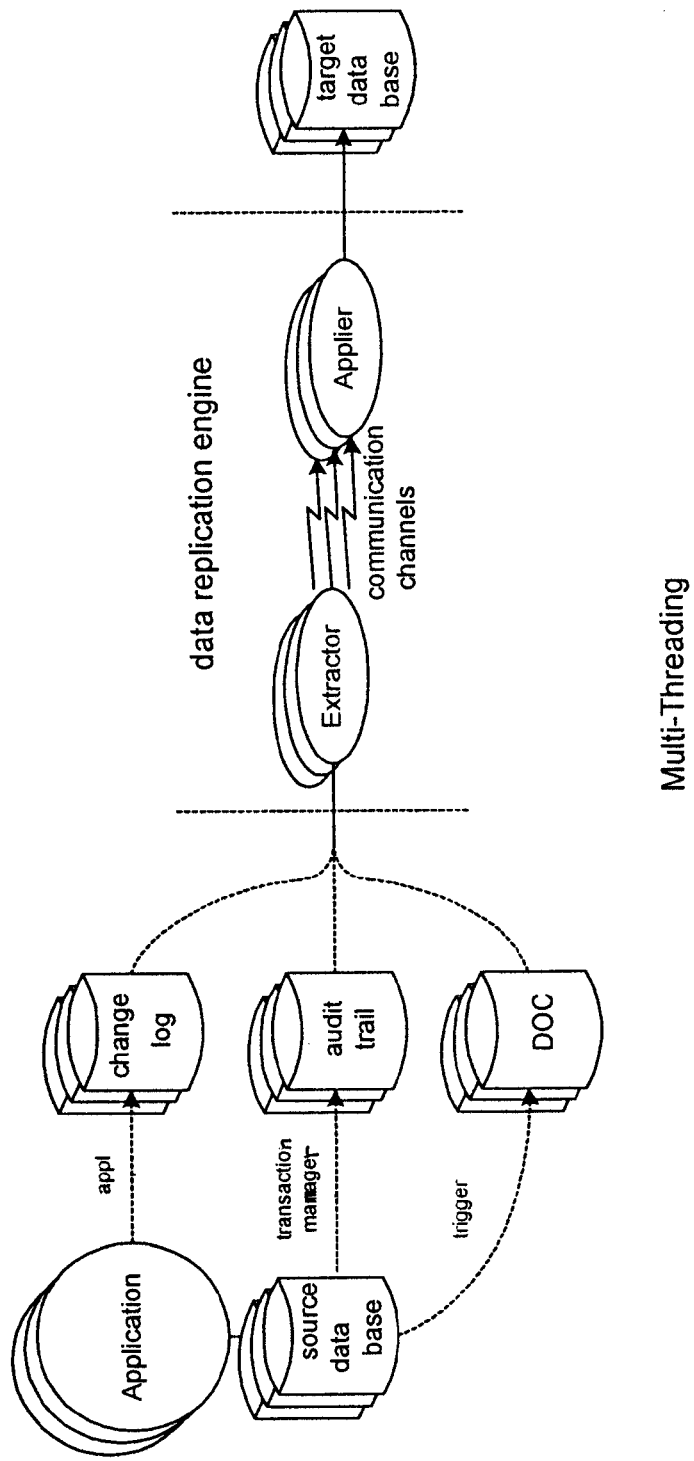
FIGS. 6a-6c show multi-threaded database replication engines in accordance with preferred embodiments of the present invention.

Extending the simple model of FIG. 2, FIG. 6a shows the multi-threading opportunities for a data replication engine (although three are shown, there can be more or fewer at each separate point along the path). One can provide parallel Extractors, parallel communication channels, parallel Appliers, parallel DOCS (which are not shown in the figure) between the extractors and the appliers either on the source side or the target side of the communications channel(s), or any combination of these.

FIG. 6a shows three sample change queue collection methods—an application-generated "change log", a transaction manager-generated "audit trail", and a trigger-generated "DOC". Although these may be used in combination, in a practical sense generally only one approach is used for collecting a particular source file or table's changes at a time. Collectively, these sample collection methods are all referred to as the "change queue" or "audit trail" in the rest of this specification.

The multiple applications shown in this figure represent one or more application programs or processes that can be accessing the same source database (which itself can be spread across multiple disk packs and/or multiple systems) and updating the data records or rows in it.

As an alternative, multiple application programs may be updating multiple source databases, each with multiple audit trails, DOCS, or Change Logs resident on different nodes; and the replication engine may be updating multiple target databases.

Figure 6B:
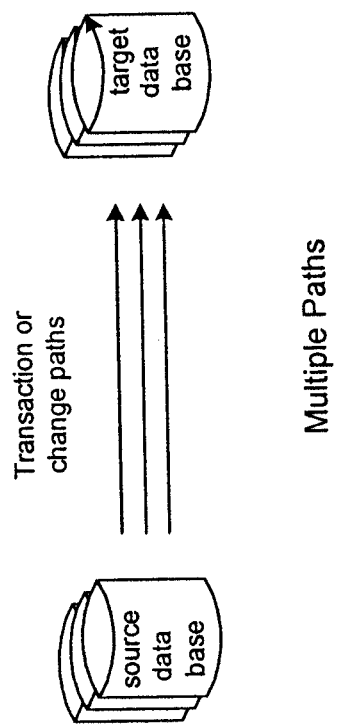
Figure 6C:
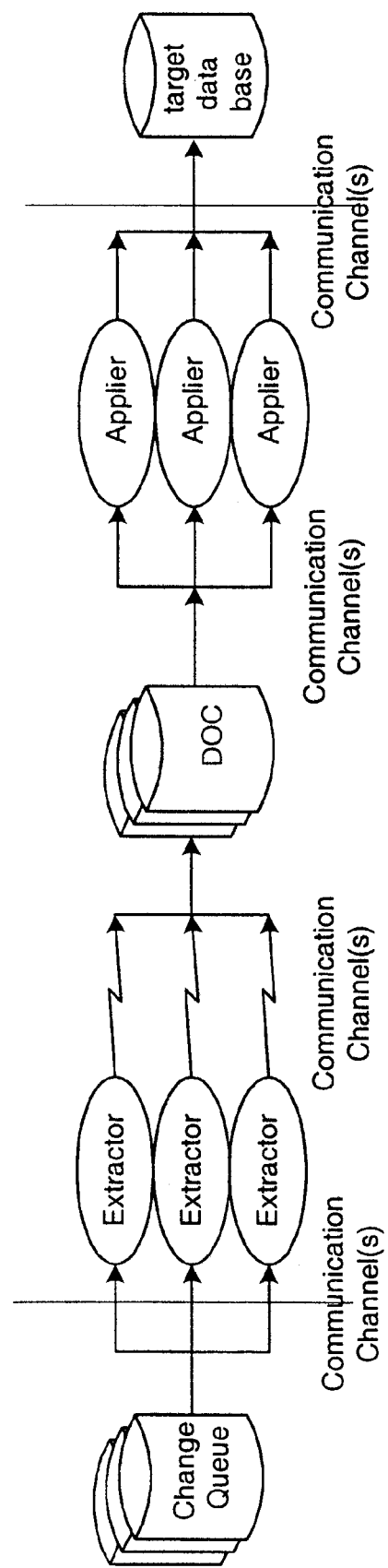

As shown in FIGS. 6b and 6c, in such a multi-threaded environment, transactions and perhaps even the changes within transactions may be flowing across multiple independent paths from source to target. Unless care is taken, there is no control as to the order in which transactions or their changes will arrive at the target system and be applied to the target database, thus leading to the previously described potential database corruption when natural flow is abandoned.

As depicted in FIG. 6c, the number of paths between each of the components (Extractor, Communication Channels, DOCS, and/or Appliers) need not be the same (three are shown at each, although they could be different for each component), as there can be more or fewer at each point depending on the performance needs of the replication environment. One or more communication channel(s) are shown at various points in the diagram to show that each of the components may be co-located, or remote, from the next component in the replication path.

The end result of the present invention is to provide any or all of the parallel paths shown for performance/efficiency reasons, yet still preserve the integrity of the target database either during and/or after the replay of the transactions.

There are several distinct cases for the ordering of database modifications in multi-threaded replication engines including:

1. Update order is not important so long as transaction boundaries are preserved.
2. Update order within transactions must be maintained, but transaction order is not important.
3. Transaction order must be maintained, but update order within a transaction is not important.
4. Complete natural flow must be observed.

Natural flow order within a transaction can be violated if the target system does not check referential integrity until commit time unless a transaction makes multiple changes to the same row or record. In this case, natural flow of changes within a transaction may have to be observed to prevent an earlier change from overwriting a later change.

The natural order of transactions affecting related tables or files must usually be maintained, but the order of transactions affecting unrelated tables or files generally does not have to be maintained.

In the following sections, various multi-threaded architectures are described along with methods to enforce partial or total natural flow as part of the present invention.

1. Multi-Threaded Extractor

The Extractor can be made up of multiple extraction threads or multiple extraction processes. There are many possible architectures, in some cases driven by the source database architecture. In any case, there must be some algorithm to ensure that change events are applied to the target database in the required order. (The requirement for natural flow can be relaxed in some cases such as restart scenarios, providing that the brief period of referential integrity relaxation is corrected at the end.) Typical algorithms include a set of rules for what is sent over each Extractor thread, a facility that allows the Extractors to coordinate their activities with each other, and/or a facility that serializes all updates within a transaction before they are applied to the target database. Extractor-based algorithms include the following.

a. Rules-Based Extractor Assignment Rules-based algorithms include assigning each file or table to a specific Extractor. If there are files or tables that have a referential integrity relationship with each other, then the entire group should be processed by a particular Extractor. In this way, any modification sequence that may have a referential integrity impact is sent and applied in natural flow order.

Figure 7A:
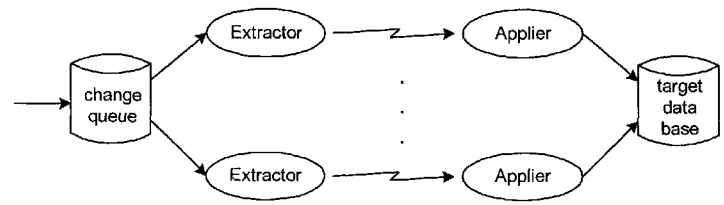
FIGS. 7a-7h show multi-threaded extractors in accordance with preferred embodiments of the present invention.
Figure 7B:
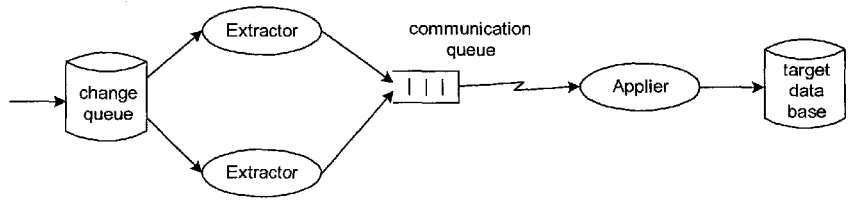

Whether the Extractors have dedicated Applier threads as shown in FIG. 7a, or communicate with a common applier through separate communication channels or through a common communication channel as shown in FIG. 7b, this algorithm will ensure that all changes to a related set of tables will be applied to the target base in full natural flow order.

b. Expected Ends

In many cases, most tables and files in an application are related, and segregating them over a single Extractor may not provide effective load sharing over multiple Extractors. Furthermore, rules-based algorithms may not provide much flexibility in adding Extractors if increases in transaction activity overload an Extractor dedicated to a related set of files or tables.

In these cases, the use of multiple Extractors implies that changes to related tables or files will flow over different Extractors and will be delivered to the Applier in a somewhat random order. If the order of changes is not important, then using a simple multi-threaded Extractor is an appropriate solution. However, if change order is important, the Extractors and/or the applier must be more sophisticated.

Figure 7C:
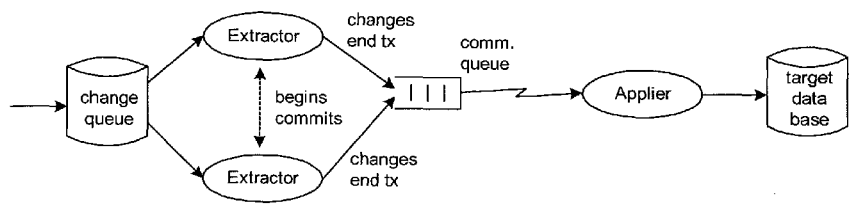

In this case, if several Extractors are involved in a transaction, the problem exists of how the begin/end commands are replicated since they are not associated with a specific file or table. A solution to this may be characterized as "expected ends" (FIG. 7c). In principle, some Extractor is going to find a begin transaction command and will send it to the target system. (In some systems, a begin transaction command is implicit in the first modification for a new transaction.) This might be a Master Extractor which is charged with the responsibility for sending begin/ends. It might be the first Extractor to find the begin if multiple Extractors are sharing the same Change Queue. If there are multiple Change Queues each serviced by its own Extractor, it might be the Extractor that finds the begin transaction command. In any event, there must be a mechanism that guarantees that the begin transaction will be applied once and only once.

Begin coordination between Extractors can be accomplished in many ways, such as:

(i) each Extractor sending begin determinations to the other Extractors indicating the transaction id.
(ii) the Extractors coordinating begins through a common table.
(iii) using a Master Extractor which is responsible for scanning the Change Log and sending begins and ends.

Alternatively, the Applier(s) could detect duplicate begins and ignore them.

Likewise, some Extractor will find the commit transaction command. It is not sufficient for that Extractor to simply send the commit to the target system and for the target system to execute a commit action when it is received. All modifications associated with that transaction may not have reached the target system if they are traveling over other threads. Rather, a commit token of some sort (perhaps the commit command itself or some representation of it, such as its location in the Change Queue) is sent over all Extractor threads (or at least over those threads that are involved in the transaction). Each Extractor thread must insert the commit token in proper time or event sequence into its stream, at least to the extent that the commit is not inserted ahead of other related events that occurred earlier.

This can be done, for instance, by having the Extractor that found the commit notify the other Extractors of its date/time stamp or file position. As each Extractor reads a change that has a later date/time stamp or file position, it knows that it has sent all changes for that transaction and can send its own end transaction command or token.

When the commit token is received at the target system from all of the Extractor threads (or at least those involved in the transaction), then the transaction can be committed by an Applier since it is now guaranteed that all modifications have been received from all involved Extractor threads. In effect, the data replication engine will run at the speed of the slowest thread.

So far as the data modifications within a transaction are concerned, the order of arrival at the target database is not guaranteed because the modifications may travel over separate threads. If all modifications for the same file are sent over the same thread, thus guaranteeing their order, they can be applied as soon as they are received so long as inter-transaction referential integrity is not an issue. The last thread to receive the commit token will be responsible for committing the transaction (either itself or by notifying the transaction owner—the thread that began the transaction).

However, if the database manager checks referential integrity on each modification event, then an event sequence which causes a referential integrity violation may cause the database manager to reject the transaction. If this is a concern, then data modifications within a transaction must be properly re-serialized at the Applier, as is discussed later.

c. Expected Ends for Distributed Transactions

Figure 7D:
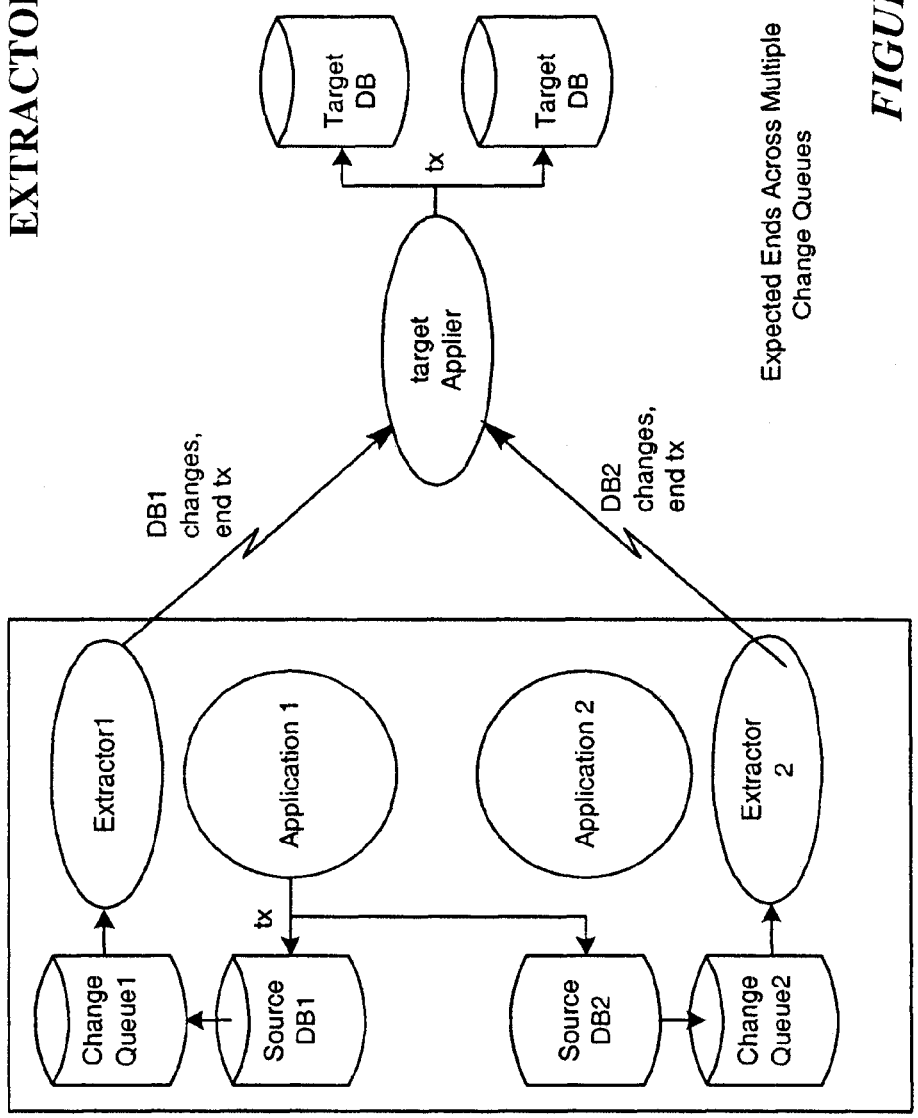
Figure 7E:
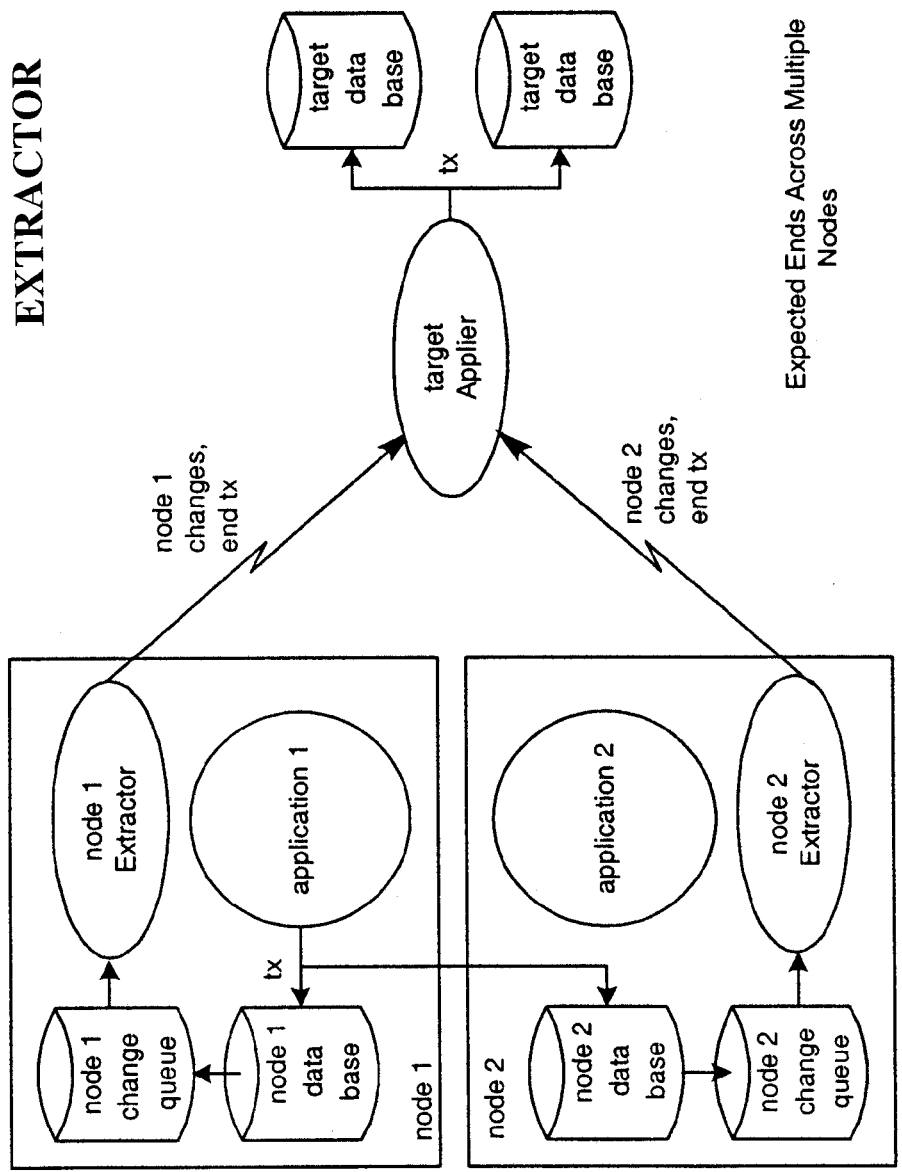
Figure 7F:
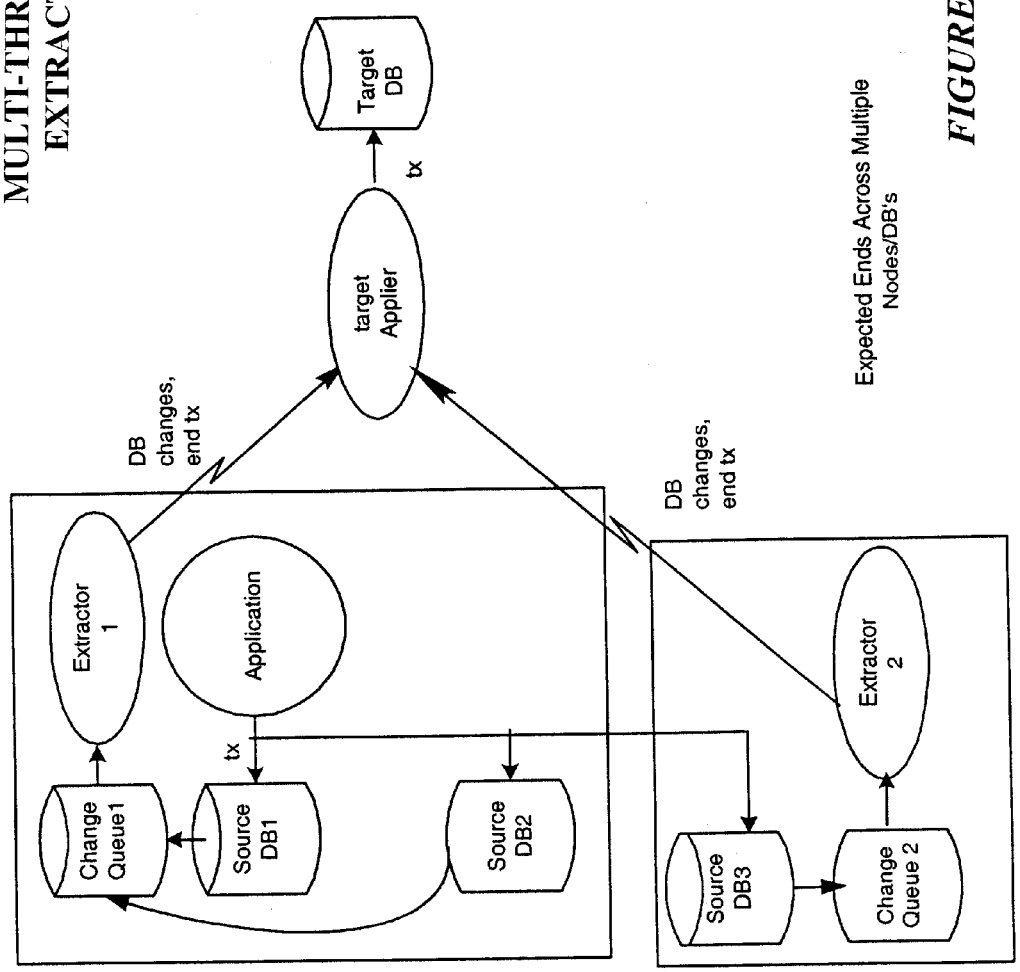

The Expected Ends algorithm can be expanded to handle distributed transactions. As shown in FIG. 7d, FIG. 7e, and FIG. 7f, a distributed transaction is one that spans two or more physical change queues (one "logical" change queue). These change queues may be on one node (as shown in FIG. 7d), or may be distributed among multiple nodes as shown in FIGS. 7e and FIG. 7f. In any event, the scope of the transaction to be replayed at the target includes all updates from all source databases.

Note that FIG. 7d shows an example of replicating the source databases to the same number of target databases, whereas FIG. 7f shows an example of replicating the source databases to a common target database. The scope of the present invention is meant to cover those architectures where the target database may or may not be the same as the source database.

For example, as shown in FIG. 7d2, the HP TMF transaction monitor system allows source databases to span more than one node. A change queue (called an "audit trail" in HP's terminology) is resident on each node. When a transaction updates data on each of these source nodes, the change queues from each of the nodes must be accessed and the change events merged to recreate the entire source transaction for replay.

An additional example, similar to FIG. 7e, where multiple physical, perhaps heterogeneous, change queues need to be merged into one logical queue exists with the Tuxedo Heterogeneous (or Distributed) Transaction Monitor. Tuxedo is an architecture promoted by BEA Systems, of San Jose, Calif. By using this architecture, transactions can span heterogeneous databases, each with their own internal transaction monitor and change queue type. To replay these heterogeneous, distributed, transactions, the change queues from each of the nodes must be accessed and the change events merged to recreate the entire source transaction for replay. An example of this is shown in FIG. 7f.

If the databases over which the transactions are distributed are on different nodes (and possibly even different database types), it may be impractical to coordinate begins and ends being processed by the various Extractors as described above. For this case the Expected Ends algorithm described above can be modified as follows.

The Change Queue for each database will generally contain not only the changes to its database, but will contain the begin and end commands that define those changes to be part of a transaction. The transaction id or some other identifier on each of the databases for a given transaction will be the same or will be related in some predictable way.

Each node will replicate its own changes to the target system, including its own begin and end commands. The Applier can ignore duplicate begin commands, and will commit (or abort) the transaction when end commands have been received from all involved nodes.

d. Inter-Extractor Coordination

When multiple Extractors are reading from a common Change Queue, provision must be made to ensure that each transaction and each change is read once and only once, or if read multiple times that it is only processed once. There are several ways to do this, including the following.

Figure 7G:
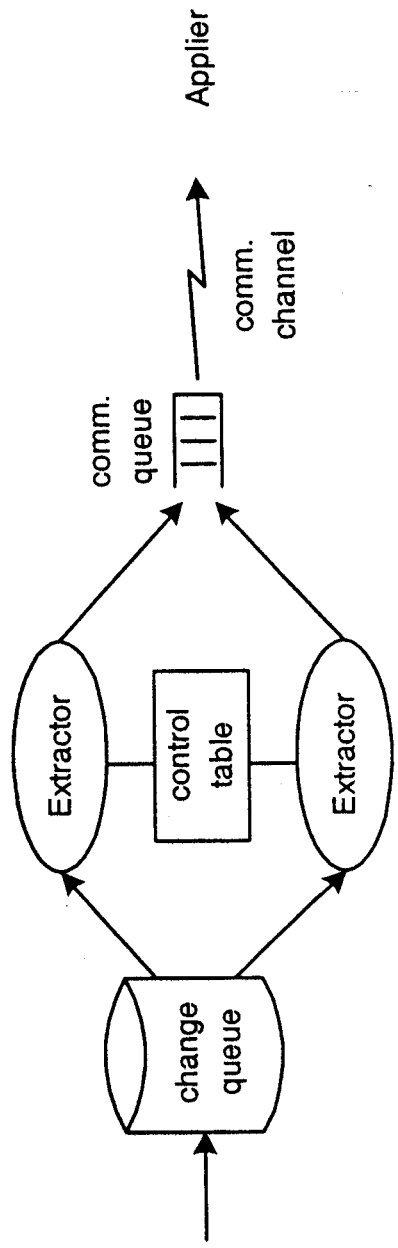
Figure 7H:
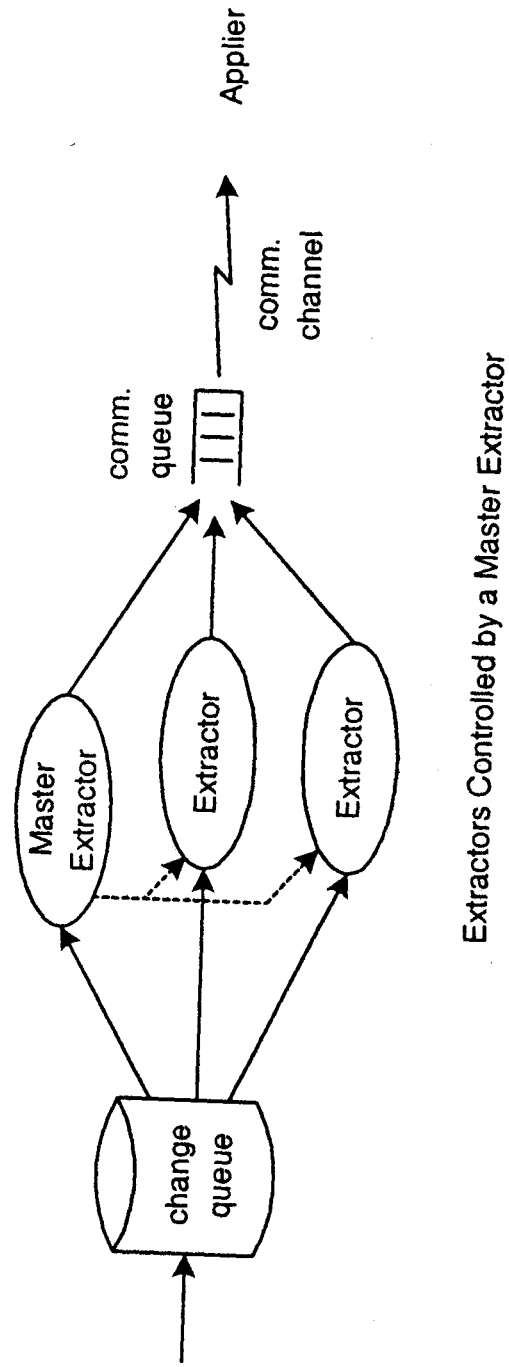

One way to assign transactions to the Extractors is via a Control Table as shown in FIG. 7g. This Control Table may be maintained in memory to improve performance, it may be disk-resident to aid in recovery (following a source node or network failure, for example, a durable copy of the Control Table can indicate which transactions have been successfully replicated or to what point in the Change Queue the Extractor had progressed), or it may be implemented by marking the events in the Change Queue itself.

Change modifications must be sent to the Extractors by some method. One method is for all Extractors to read the Change Queue for all changes. Each is looking for a begin transaction command (which may be implicit in the first change event). When it finds one, it will lock the Control Table (or perhaps just a record in the Control Table for this transaction) and check to see if this transaction has been claimed by another Extractor (if the Control Table or record is already locked, the Extractor will wait until it can acquire the lock). If the transaction has already been claimed, then the Control Table or record is unlocked; and the Extractor continues its scan of the Change Queue.

If the transaction has not yet been claimed, the Extractor will enter the transaction id in the Control Table or record, unlock the Control Table or record, and send the begin transaction command to the Applier which will begin a transaction at the target database. (An equivalent to the Control Table is to note in the Change Queue that the transaction has been claimed.)

The Extractor will then continue to read changes associated with this transaction as well as the associated end transaction command and will send these to the Applier to be applied to the target database.

The Extractor will then return to the point in the Change Queue where it found the begin transaction command and will continue scanning.

Optionally, the Applier may return an acknowledgement to the Extractor that the transaction has been successfully applied. The Extractor may mark the transaction's entry in the Control Table or Change Queue to reflect this or alternatively delete the entry from the Control Table or Change Queue.

An alternate to the Control Table is for each Extractor to take every nth transaction, where n is the number of Extractors. For instance, if there are three Extractors, Extractor 1 will take transactions 1, 4, 7, . . . , Extractor 2 will take transactions 2, 5, 8, . . . and so on.

This description is for the simple case of each Extractor handling just one transaction at a time. In many implementations, each Extractor may be handling multiple overlapping transactions at a time. The techniques above are also applicable to this case. Certain problems related to a thread handling multiple simultaneous transactions are discussed later.

There are other ways in which transactions may be allocated to threads. For instance, transactions may be allocated to threads based on which files or tables they change, as described above. Alternatively, all transactions that may have inter-transaction consistency or referential integrity issues may be sent down the same thread.

FIG. 7f shows another arrangement in which one Extractor is the Master Extractor and the other Extractors are slaves to it. The Master Extractor reads entries from the Change Queue and looks for a begin transaction command. When it finds one, it will assign this transaction either to itself or to one of its idle slave Extractors. The assigned Extractor will then read the changes and end command for that transaction and will queue them to the communication channel for transmission to the target system.

This coordination technique of using a Master Extractor is also applicable to end-to-end threads, as shown in FIG. 7a.

e. Serializing Transactions

Figure 8A:
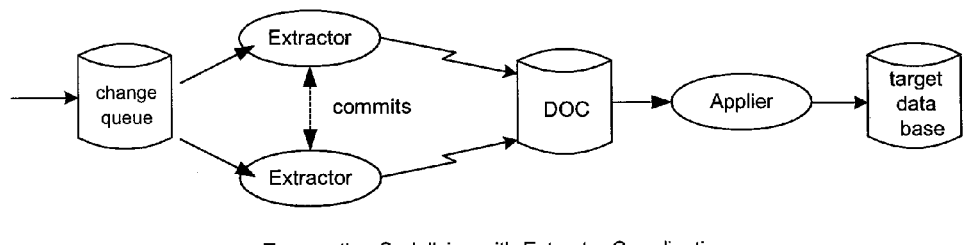
FIGS. 8a-8b show configurations for performing inter-transactional referential integrity in accordance with preferred embodiments of the present invention.
Figure 8B:
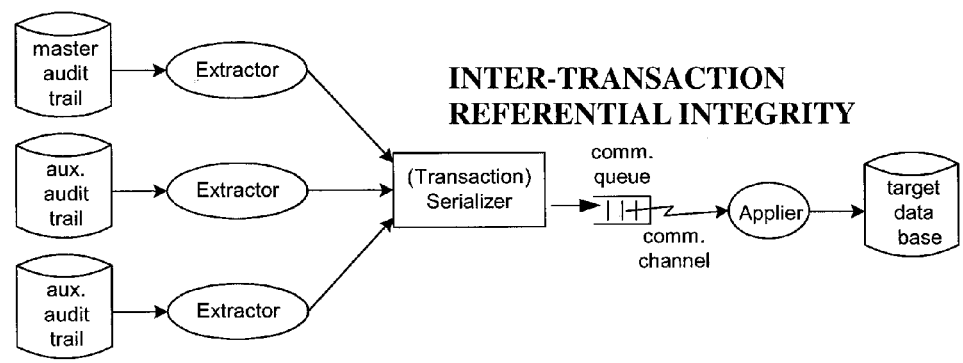

The extractor architectures described above with reference to the FIGS. 7a-7h may in some cases guarantee the natural flow of changes within a transaction, but they generally do not guarantee the natural flow of the transactions themselves. FIGS. 8a-8b show some architectures that will guarantee not only intra-transaction natural flow, but also inter-transaction natural flow.

One way to accomplish inter-transaction natural flow is for the Extractors to coordinate their commit activities as shown in FIG. 8a. By communicating with each other (perhaps via a common table or via messages), an Extractor that has received a commit can hold that commit until any previous commits have been applied to the target database.

In this way, transactions are applied to the target database in natural flow order. If all changes for a particular table or file are also sent over the same Extractor, then full natural flow is assured.

In some cases, the database will distribute its change records over multiple disk volumes to improve performance. In one such implementation, there is a Master Audit Trail disk volume and one or more Auxiliary Audit Trail disk volumes (FIG. 8b). The Master Audit Trail usually contains the begin/end commands, possibly certain change records, and pointers to all other change records for each transaction, thus preserving natural flow. The change records are distributed across the Auxiliary Audit Trails.

An Extractor is provided to read one or more audit trail volumes. Each Extractor sends its data to a common Serializer (which may be resident on either the source or target system) which maintains in memory or on disk the begin/end command for a transaction, pointers to its change records, and the merged change records as read from the Master Audit Trail and the Auxiliary Audit Trails. It is the job of the Serializer to queue intra-transaction data to the communication channel or channels in proper order (begin, changes, end). The Serializer may also be responsible for queuing the transactions themselves to the communication channel or channels in natural flow order. In this case, through the use of a Transaction Serializer, all transaction data will be sent over the communication channel or channels in natural flow order.

f. Serializing Database Modifications

A Transaction Serializer can also be used with the architectures of FIGS. 7a-7h and FIG. 8a. Without a Transaction Serializer, these architectures may guarantee natural flow within a transaction but not between transactions. With a Transaction Serializer, any multi-threaded Extractor architecture will provide natural flow both within transactions and between transactions.

If the communication channel is single-threaded, natural flow is preserved at the input to the Applier. If the Applier is also single-threaded, natural flow is preserved at the target database.

Transaction serialization may also be accomplished by using a DOC as shown in FIG. 8a and as described later.

2. Multi-Threaded Communication Channel

If the transaction rate is so high that it may overload a single communication channel, then the load can be split across multiple communication channels. There are several ways to do this.

Figure 9A:
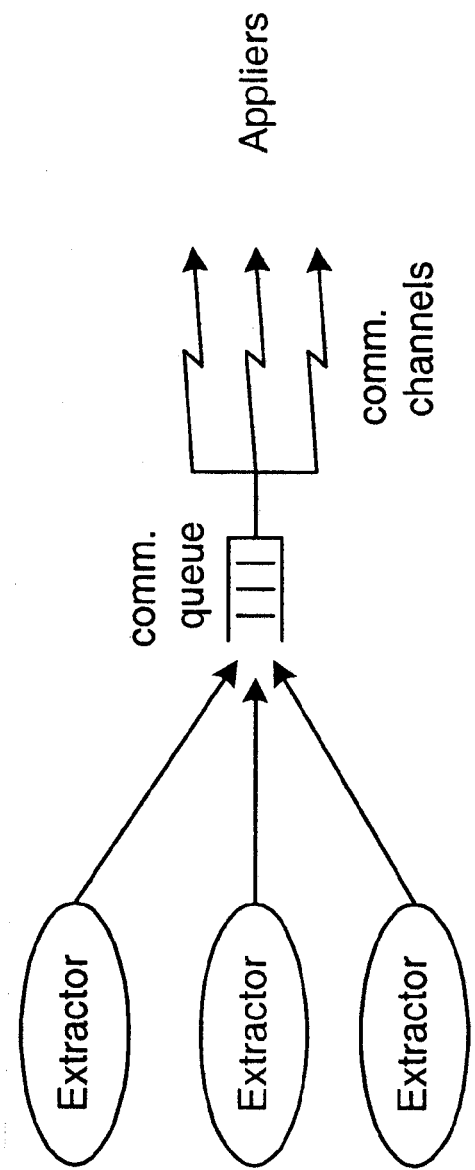
FIGS. 9a-9c show multi-threaded communication channels in accordance with preferred embodiments of the present invention.

One way is for the Extractors to pass their transaction data to a common communication queue which is read by all communication channels, as shown in FIG. 9a. However, any semblance of natural flow even within a transaction will be lost as changes will be delivered in unpredictable order to the Appliers. Unless there is a higher communication level that can guarantee that messages will be delivered in proper order, a Serializer will be required at the target system. This is described later.

Figure 9B:
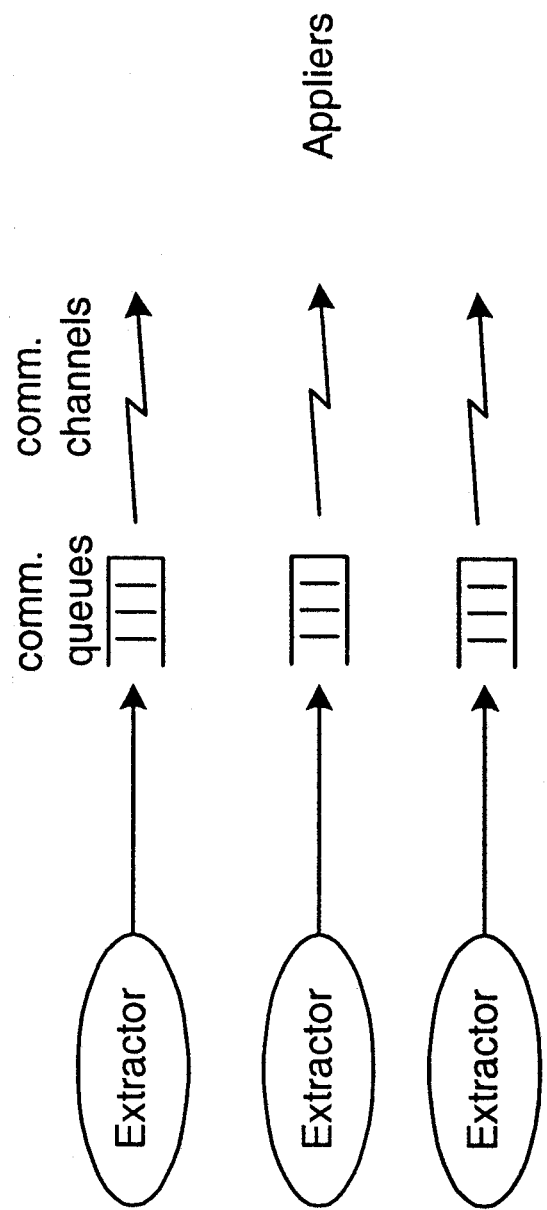

Alternatively, each Extractor can feed its own communication line, as shown in FIG. 9b. This will protect the intra-transaction natural flow as long as the Extractors have provided intra-transaction natural flow. However, in this architecture, neither the Extractors nor the communication channels support inter-transaction natural flow.

Figure 9C:
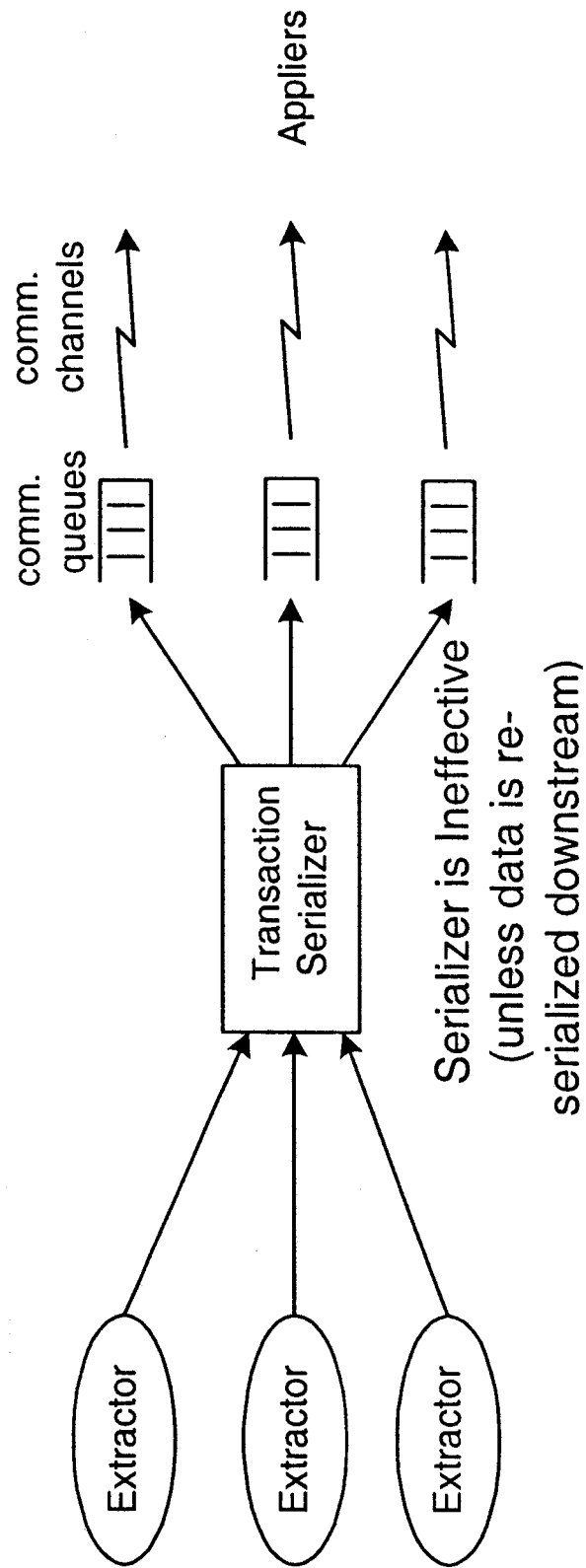

If transaction natural flow must be delivered to the target node because there is no re-serialization capability in the target node, then multiple communication channels cannot be used unless a higher level is provided to place messages into the proper order. Even if a Transaction Serializer is used to serialize transactions fed to the communication queue by the Extractors, as shown in FIG. 9c, all serialization will be lost when transactions are sent over separate communication channels that did not have a reordering capability at the receiving end.

Unless the communication channels as a group can guarantee delivery in the proper order, the only way that transaction natural flow can be guaranteed to be delivered to the target system is to use a single communication channel between the source and target system. If only intra-transaction natural flow is required, then multiple communication channels can be used by associating each with a specific Extractor as shown in FIG. 9b, providing that each transaction is sent by a single Extractor.

3. Multi-Threaded Applier

To obtain the required performance, the Appliers may also be multi-threaded. In the case shown in FIG. 10a, transactions with changes in natural flow order are received by a Router, which routes each transaction to one or more synchronized Appliers (though each Applier can be handling several interleaved transactions simultaneously). Each Applier starts or joins the appropriate transaction, applies the transaction changes, and then may commit the transaction (or abort it if the source system has aborted it).

a. Suspend on Commit

Figure 10A:
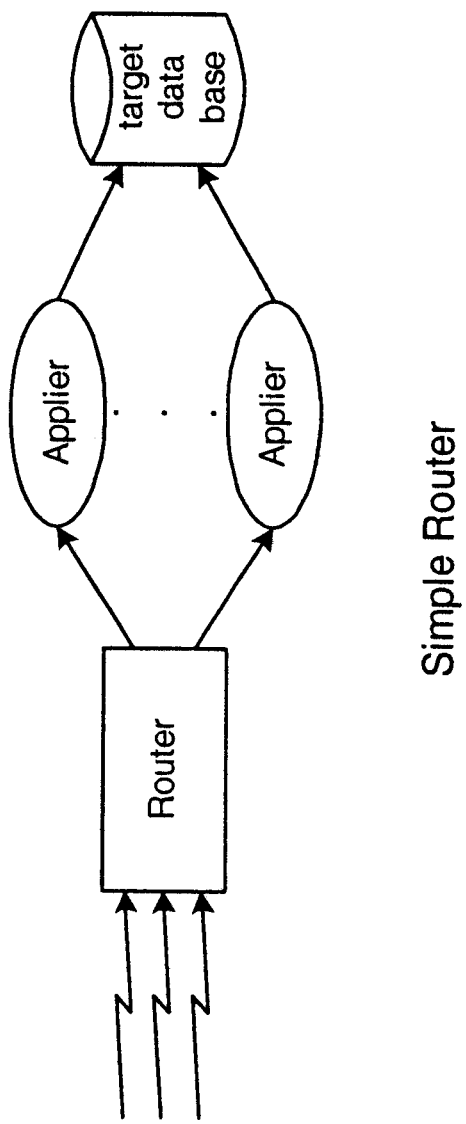
FIGS. 10a-10d show multi-threaded appliers in accordance with preferred embodiments of the present invention.
Figure 10B:
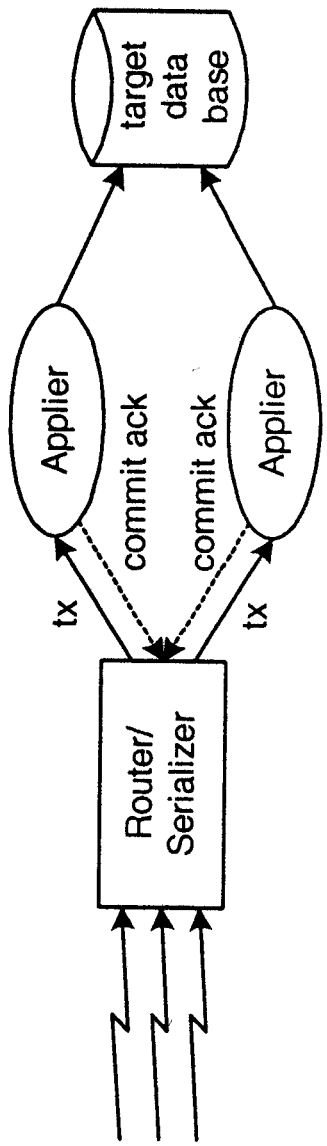

In the architecture of FIG. 10a, each transaction is guaranteed to have its changes applied in natural flow order. However, additional precautions must be taken by the Router if transaction order is to be preserved. To accomplish this, the Router will still send multiple transactions to multiple Appliers, one or more transactions per Applier. However, the Router must guarantee the correct commit order via some algorithm. One such algorithm is for the Router to serialize all change events in its own memory space and to distribute properly serialized begin transaction commands and updates to its Appliers until it reaches a commit token (which could be a set of commit tokens received over all threads involved in a transaction). At this point, it will suspend the routing of begin and change information and will just send a commit command to the Applier managing that transaction. It will wait for that Applier to acknowledge that it has completed the commit operation as shown in FIG. 10b, and it will then continue sending further begin and update messages to its Appliers. In this way, transaction order is guaranteed.

Performance can be improved by having the Router continue to send database changes to the Appliers, but with an instruction not to apply these changes until the Router sends permission. At that time, each Applier is free to apply the changes which it has accumulated. In this way, the Router need never pause.

Alternatively, the Appliers, via a common table or some other synchronizing means, can coordinate their updates based on some ordering criteria such as a sequence number or a date/time stamp as described next.

b. Appliers Coordinate Commits

Requiring that the Router hold up the distribution of begins and changes while a commit is taking place slows down the replication process. An alternative strategy is to simply let the Router distribute begin, change, and commit events as it receives them. It then assigns each transaction to a specific Applier, as described above. However, all Appliers apply their transactions as soon as they have them and coordinate only their commits. An Applier will hold up a commit if there are earlier commits outstanding. If two transactions attempt to update the same data item out of order, then the Applier with the earlier commit will not be able to lock the data item; and the Applier with the later commit will not be able to commit and unlock the item. Consequently, a deadlock occurs.

This deadlock is easily resolved by aborting the newer transaction (i.e., that transaction with the later commit) that is holding the data item lock out of order (or at least requiring that the Applier improperly holding the lock release the lock). This will let the earlier transaction complete, and the newer transaction can then be retried by the Applier that had to back off. By allowing such deadlocks, all Appliers may be running at near full speed; and replication capacity may be greatly enhanced. Even if there are many deadlocks, this approach will often yield higher throughputs than the earlier techniques which allow only one transaction commit at a time.

Multiple communication lines can be used to send change data to the Router since the Router can serialize transactions. In fact, though the above description has assumed that changes within a transaction will be received in natural flow order, the Router can be designed to provide complete serialization, both intra-transaction and inter-transaction.

c. Using a DOC

In some cases, it will be advantageous to write all incoming transactions to an intermediate disk-based or memory-resident DOC. This is useful, for instance, if there is no transaction manager at the target database. Using a DOC allows aborted transactions to be filtered out and not applied to the target database (a Router, if used, can also provide the same function). A DOC will also provide queuing storage to accommodate peak change rates that may overwhelm the Router or the Appliers.

Figure 10C:
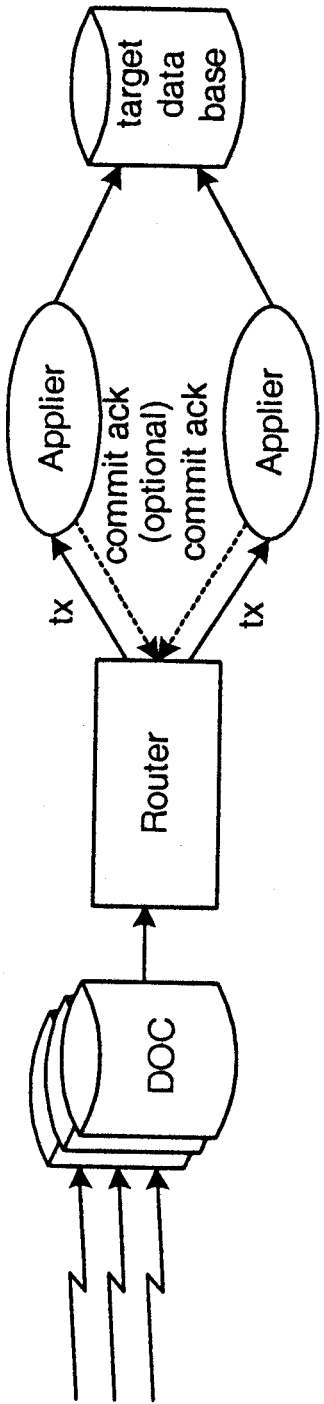

If a DOC is provided, there are several architectures to read changes and then to apply them with multi-threaded Appliers to the target database. As shown in FIG. 10c, one way is to provide a Router to read the DOC. In this case, the Router is much simpler in that the DOC can provide both intra-transaction and inter-transaction serialization functions via its indices. The Router can request the next transaction in commit order and can assign it to an Applier. It can then read the changes for that transaction in order or request the Applier to do so.

If transaction natural flow is to be preserved, then any of the procedures described earlier can be used. If the Router is reading the DOC, it can suspend distribution of updates when it sends a commit to an Applier until the Applier acknowledges that it has completed the commit.

Figure 10D:
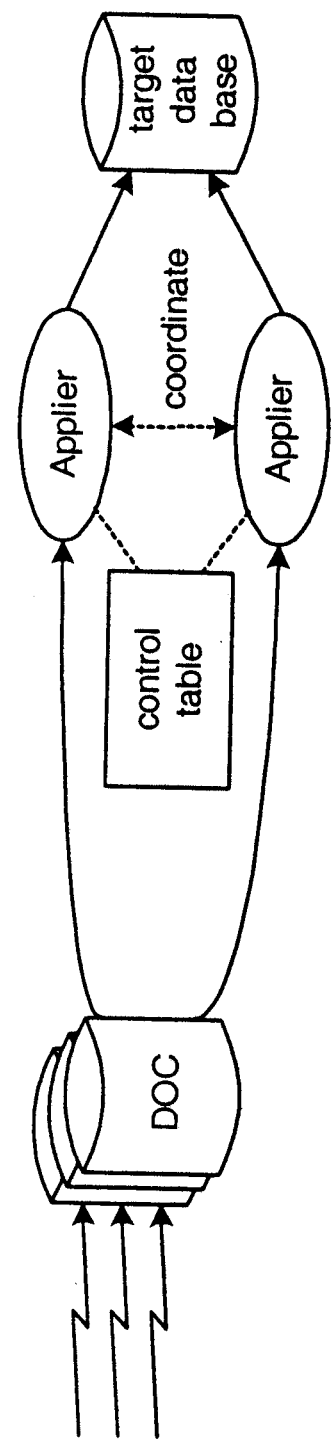

Alternatively, multiple Appliers can coordinate with others, as shown in FIG. 10d. All Appliers read the DOC and use a Control Table to allocate transactions. However, transaction commits are coordinated by communication between the Appliers or alternatively via the Control Table. In this case, a virtual Control Table can be implemented via DOC keys. By properly structuring the keys to the transaction commits stored in the DOC, such as in ascending commit timestamp order, each Applier can read the next free transaction in commit sequence. After processing that transaction, the Applier could remove that entry from the DOC's key path to keep subsequent access along the path more efficient.

If the Appliers apply modifications as they receive them, and if either they or the Router coordinate the commits, then the techniques described above guarantee that transactions are applied in natural flow order; unfortunately, modifications may not be. As a result, deadlocks may occur. However, if each Applier holds its modifications until the previous transaction has committed, then natural flow order of transactions and modifications is guaranteed, and no deadlocks will occur. The consequence of this is reduced performance, since only one transaction at a time is being applied to the target database.

It must be noted that a DOC may provide many of the functions attributed to other components in the descriptions above by making judicious use of indices into the DOC, and by specifying an intelligent locking protocol as described later. These functions include:

(i) routing to the Appliers (in this case, a Router is not required).

(ii) serializing events to the Appliers (in this case, a Serializer is not required).

(iii) coordinating the Appliers (in this case, a Control Table is not required).

These functions can be provided by the DOC whether it is disk-based or memory-resident.

B. Exceeding Transaction Threshold Limits

In the systems which we have considered, many applications are active simultaneously and, in fact, may themselves be multi-threaded. All application threads may be generating transactions independently. Although each application thread is generally only processing one transaction at a time, the multiplicity of application threads means that at any point in time there are many transactions that are in progress. This mix of transaction activity is represented in the Change Queue (whether it be a change log, an audit trail, or a DOC) by intermixed entries for several transactions.

Each Applier must manage each of its transactions as that transaction is applied to the database. It must begin the transaction, apply the transaction's modifications to the target database, and then commit (or abort) the transaction. During the time that the transaction is open, the Applier owns the transaction (some transaction subsystems actually allow multiple Appliers to "own" the same transaction, possibly even at the same time, in these cases the Applier(s) will be performing work for the same transaction. In this case, it is still important to replay the events in natural flow order).

In many systems, an Applier may own several transactions simultaneously (typically, one per thread). The requirement for natural flow means that the Applier must execute these transactions in the same or similar order as they had been executed at the source system, at a minimum in the same commit order for related data. Therefore, the Applier should be able to accept all new transactions as they are assigned to it.

However, in many systems there is a limit as to how many transactions a process may own, or to the aggregate number across all of the processes. If the Applier reaches its transaction or the system's limit, it cannot process the next begin transaction command, which means that it cannot process the rest of the changes for its currently open transactions and still maintain natural flow order. In effect, the replication process is blocked; and replication halts.

There are several ways to resolve this and other transaction threshold limit problems.

1. Multiple Appliers

The use of a multi-threaded Applier was described in reference to FIGS. 10a-10d. When one Applier is insufficient to handle the transaction load, several such Appliers may be provided to share the transaction load. To guarantee natural flow order, the actions of the Appliers are coordinated through means such as a Router/Serializer or a Control Table.

With this technique, if the number of concurrent transactions becomes too large for the current set of Appliers, then additional Appliers may be spawned. When the transaction load diminishes, excess Appliers may be terminated.

One problem with multiple Appliers is that transaction commits must be serialized as described above if natural flow is to be preserved, thus posing a potentially significant performance problem. That is, by coordinating transactions with each other, the Appliers guarantee that transactions will be executed in natural flow order but may have to pause often while earlier commits are applied.

As a consequence, the application of transactions is not fully multi-threaded; and the resultant set of multiple Appliers may not provide the performance enhancement that is expected.

2. Partial Transactions

In addition to the threshold limit of too many transactions for either the system or a single Applier, additional transaction threshold limits may be imposed by the transaction processing subsystem; and these may be different between the source system's settings and the target system's settings. These include:

a. Transaction duration, or time span, threshold limits. In this case, the transaction subsystem may limit the total duration time of a transaction.

b. Transaction change queue data size threshold limits. In this case, the transaction subsystem may limit the amount of change queue space that the transaction spans or consumes.

c. Transaction change event threshold limit. In this case, the transaction subsystem may limit the number or type of events or operations or data locks that exist in a transaction.

In all these cases, another approach to resolving them and allowing the replication engine to continue when it encounters one or more of these limits is to prematurely commit one or more of the outstanding transactions.

More specifically, for example, if the Applier reaches its or the system's concurrent transaction threshold limit, it will choose one or more existing open transactions and will commit them prematurely, called transaction "precommitting", thus freeing up slots for following transactions. Later, if another modification for the prematurely committed transaction arrives at the Applier, the Applier will start a new transaction for the recently received modification. If the transaction limit is once again reached, the above process is repeated.

A similar sequence can be implemented if any other transaction threshold limits is being reached. In this case, the different transaction processing subsystems between the source and the target may have differing limits on the length of time or system resources they allow a single or set of transactions to consume. In such a system, if the source allowed considerably more resources to be consumed or time to elapse than the target does, it is possible that the target can never be able to replay the transaction mix because doing so would consume more than the allowed limit of resources or time. In this case, as with the cases described above, prematurely committing the transaction (or transactions) provides a solution.

As a consequence of precommitting transaction(s), during periods of peak activity or when the resource limits are almost exhausted, a transaction might be broken up into two or more sub-transactions. During this period, the database may exhibit inconsistency and referential integrity violations. However, all transactions and data modifications are applied in natural flow order; and the database will return to a correct state when all partially committed transactions have been terminated (either with a final commit or an abort).

Unless the Applier is being driven by a mechanism such as a DOC to filter out aborted transactions, some of these partially committed transactions may eventually abort. The replication engine will not be able to use the target system's abort facility to abort the previously committed partial portions of the transaction. Therefore, it is important that the replication engine replicate undo events or before images for aborted transactions. An undo event for an update is another update with the before image for that data item. An undo event for an insert is a delete, and an undo event for a delete is an insert. These undo events should be replayed at the target system in natural flow order.

Alternatively, if there is a transaction log on the target database, then undo events may be mined from that log.

3. Adaptive Replication Engine

One can combine all if these approaches to balance performance and complexity by having the replication engine be adaptive. One such architecture is described below.

During low traffic times, a single Applier is used between the source database and the target database.

If the Extractor discovers that its Applier is approaching the transaction limit, it can spawn another Applier at the target system and establish a connection with it. It can then distribute transactions between its two Appliers. If these Appliers start to become full, the Extractor can spawn another Applier, and so on.

If the number of simultaneous transactions reaches a system limit, then the Appliers can do partial commits to limit the number of outstanding transactions in order to remain within the system limits. During this time, the target database may not be in a consistent state to a viewer; but no transactions or data will be lost, and the database will return to a consistent state after all of the partially committed transactions end.

As the traffic peak diminishes to an appropriate level, the Appliers can be commanded to return to normal transaction committing. After a short period, the target database will return to a consistent state. As traffic further diminishes, excess Appliers can be terminated until the replication engine returns to its basic single-threaded state.

C. Resolving Deadlocks

When using asynchronous replication to synchronize database nodes in a network, deadlocks may occur that could stall or stop a replication engine. There are at least two types of deadlocks to consider:

a. deadlocks on a data item.
b. deadlocks on a commit.

1. Deadlocks on a Data Item

A deadlock on a data item occurs when two different applications (including Appliers) must wait on locks held by the other. In non-distributed applications, this can occur if the applications are trying to lock the same two data items but in different order. Application 1 locks data item A and tries to get the lock on data item B. In the meantime, Application 2 locks data item B and then attempts to lock data item A. Neither can proceed.

This is the standard type of deadlock and can be avoided by an intelligent locking protocol (ILP). Under an ILP, all locks are acquired in the same order. Therefore, if a second transaction must wait on a data item locked by a first transaction, then the second transaction cannot lock a data item that will subsequently block the first transaction.

As an example, an application may first have to lock a row or record which acts as a mutex (an object which guarantees mutual exclusion). For instance, the application might have to obtain the lock on an order header before it can lock any of the detail rows or records for that order. In this way, if an application finds a data item locked, all it must do is wait until the owning application has released its locks; and it then can continue on. If an ILP is not being used, then deadlocks can be resolved by one or both applications timing out, releasing their locks, and trying again later at a random time.

Things are not so simple in a distributed system. This is because the data structures used by the databases on different nodes may be different. An ILP that works on one node may not be applicable to another node because the data structures that it depends upon may not even exist on the other node. Not only does this apply to an Applier deadlocking with an application, but it also applies to two Appliers deadlocking with each other. This is because the Appliers may be replicating data from different nodes having different data structures.

Even if the data structures are the same across all nodes, the use of an ILP in a distributed application may not prevent deadlocks if each application acquires the provided mutex in its own node. Different applications in different nodes may acquire the same mutex locally at the same time, resulting in distributed deadlocks.

One solution to data item deadlocks in a distributed system is to create a global ILP. With a global ILP, one node is designated the master node, and an application or Applier must first obtain ownership of a mutex provided by that node before it can proceed. Note that once the mutex is obtained, updating all replicate copies of the database in parallel can be done. In this way, only one application or Applier can hold a lock on a data item. Others must wait until the lock is released.

Alternatively, as with non-distributed systems, all entities could time out and release their locks, and then try again after some random time.

2. Deadlocks on a Commit

There is also the possibility that a single replication engine with multi-threaded Appliers can deadlock itself. This can occur if the Appliers are coordinating among themselves to ensure that transactions are committed in the correct order.

In some methods of inter-Applier coordination, Appliers interoperate with each other to ensure that commits are applied in proper order. When an Applier receives a commit, it will wait until the date/time stamp of database modifications being processed by all other Appliers is later than the date/time stamp of its commit before applying the commit. In this way, it knows that there are no earlier commits still flowing through other threads.

Consider an Applier 1 that has received a modification to data item A and has acquired the lock on data item A in preparation to updating it. Then Applier 2 receives through an independent thread a modification also to data item A, but for a different transaction. Applier 2 will have to wait on the lock held by Applier 1 before it can proceed. Applier 1 then receives a commit for its transaction, but observes that that commit is later than the commit for Applier 2's transaction. Applier 1 cannot proceed until Applier 2 has committed its transaction. Applier 2 cannot commit because it is waiting on Applier 1 to release its lock on data item A. Applier 1 will not release its lock until it has committed its transaction, which it can't do until Applier 2 commits its transaction. Thus, both Appliers are stalled by each other, and a commit deadlock has occurred.

One way to resolve this conflict is for the Appliers to be implemented so that they understand this situation. If this situation exists, the Applier with the later commit time will release all of its locks and try again later. This will allow the Applier with the earlier commit time to complete, thus then allowing the later transaction to be replayed successfully.

Alternatively, in this example, Applier 1 could simply time out on its commit and let Applier 2 complete its transaction. At some time later, Applier 1 could then replay its transaction. In this case, Applier 1 does not have to understand why it cannot commit. It simply knows that its commit is being held up.

However, backing off may not solve the problem since the same situation may reoccur. This problem can be resolved by committing partial transactions, as described previously. In effect, one or both threads will commit the partial transaction that they currently are managing. Each thread that does this then opens a new transaction to complete its respective transaction. Each new transaction can then modify its deadlocked data item, which the other transaction had already modified and unlocked in the partial transaction.

However, with this solution, the later transaction will update the data item before the earlier transaction, thus perhaps violating referential integrity. If this situation could cause a referential integrity problem deemed to be unacceptable, then one of the solutions described above in which the locking Applier backs off may be a preferred solution.

3. Database Hotspots

As a data item becomes more active, its chance of becoming involved in a deadlock increases. Such a data item is called a "hot spot" in the database.

A common example of a database hotspot is a row or record in a table or file used to assign sequence numbers, such as for purchase orders. Deadlocks on this row may be quite common. One way to avoid such deadlocks is to partition the sequence numbers among the various systems in the network. For instance, if there are n systems, system i is assigned sequence numbers i+kn, where k is incremented for each new sequence number. Thus, if there are three systems, System 0 will use sequence numbers 0, 3, 6, . . . , System 1 will use sequence numbers 1, 4, 7, . . . , and System 2 will use sequence numbers 2, 5, 8 . . . . Using this algorithm, the sequence number assignment table does not even need to be replicated. Each system can maintain its own sequence number table for its own use.

Alternatively, the sequence numbers can be divided into non-overlapping ranges, with each node in the network assigned one of these ranges.

4. Conflicts with another Transaction

There are two different ways that a database manager might audit changes to its database:

a) Logical Level Audit—Each logical modification to the database is logged to the audit file. Logical modifications include inserts, updates, and deletes. Each is replicated to the target database by the replication engine.

b) Base (or Physical) Level Audit—Each physical disk operation is logged to the audit file. The physical operations are replicated by the replication engine to the target system, where they are applied to the target database either as physical or logical events. In some systems, these physical disk operations might actually log an entire block of data, for example the 512 byte disk sector, that includes the data or record(s) that was changed.

Base level auditing presents a unique problem to the replication engine because each replicated event may not represent a complete logical operation. For instance, a logical insert to a file or table with multiple indices will be replicated as one update to the base file or table and one update to each of the index files or tables. The replication engine may replicate all such updates to their respective target files or tables and index files or tables. Alternatively, the replicator may apply the base file or table update as a logical update (which will update all target index files or tables whether the schema is the same or not) and will then ignore the index file or table updates.

Certain complicated data collisions (e.g., as described below, inserts that get a duplicate key error and need to be reversed) and locking conditions (e.g., as described below, a subsequent event's replay is blocked by a prior event's lock) can occur within the Appliers when updates to a file or table with one or more index are replicated from an audit file that uses base level auditing via a logical replication engine. These scenarios require special algorithms to resolve the replication event sequences because it appears to the logical replication engine that the audit file is not serialized at the logic level (see examples below).

An example of such a situation for a file with two unique indices—a primary index and a secondary index—is shown in the following table. Note that it is assumed that the base and index file or table locks for all updates done within a transaction are held until that transaction completes (commits or aborts). Also note that aborted transactions usually contain the "undo" events for all events successfully applied before the abort for that transaction, in reverse order, such that replaying the entire sequence for an aborted transaction will result in the original file or table state being restored (i.e., an undo for an insert is a delete, an undo for an update will reapply the original "before" image, and an undo for a delete is an insert).

The notation used in this example is as follows:

$t_a$ transaction a.

(x,y) record (x,y) with primary key x and secondary key y.

$B_a$ begin transaction a.

$I_{ab}(x,y)$ insert a record via transaction a into the base file with a primary key value of x and a secondary key value of y.

$I_{ai}(x,y)$ insert a record via transaction a_into the index file with a primary key value of x and a secondary key value of y.

$I_a(x,y)$ insert a logical record via transaction a (i.e., a base record and an index record) into the database with a primary key value of x and a secondary key value of y.

$U_a(x,y)$ update record x,y as above.

$D_a(x,y)$ delete record x,y as above.

$C_a$ commit transaction a.

$A_a$ abort transaction a.

In this example, the source system uses base level auditing and feeds a logical replicator. The application begins $t_1$ and $t_2$, and $t_1$ successfully inserts record (1,1). $t_2$ attempts to insert record (2,1). However, $t_1$ holds a lock on the secondary unique index with value 1, and the $t_2$ secondary index update must wait on that lock. $t_1$ is subsequently aborted which releases its locks, and $t_2$ can now complete. The result is the addition of record (2,1) into the file.

| Application | Base Level Audit Trail | Replication Engine |
|---|---|---|
| $B_1$ | $B_1$ | $B_1$ |
| $B_2$ | $B_2$ | $B_2$ |
| $I_1(1, 1)$ - locks base row 1, index row 1 | $I_{1b}(1, 1)$ $I_{1i}(1, 1)$ | $I_1(1, 1)$ |
| $I_2(2, 1)$ - index table update waits on row 1 lock | $I_{2b}(2, 1)$ | $I_2(2, 1)$ - waits on index row 1 lock |
| $A_1$ - unlocks (1, 1) | $D_{1i}(1, 1)$ [undo] | lock timeout |
| | $D_{1b}(1, 1)$ [undo] | pre-commit |
| | $A_1$ - locks released on (1, 1) | retry $I_2(2, 1)$ - fails due to duplicate index |
| $I_2(2, 1)$ - index table updated | $I_{2i}(2, 1)$ | $U_2(2, 1)$ - fails due to non-existent record |
| $C_2$ | $C_2$ | Discard (1, 2) |
| | | $D_1(1, 1)$ |
| | | $A_1$ |
| | | $C_2$ |
| (record (2, 1) added) | | (no records added) |

Since the source system uses base level auditing, the audit trail will reflect the successful operations to each of the base and index files/tables. It will contain the begin commands for $t_1$ and $t_2$ (unless these are implicit begin commands) and the inserts for records (1,1) for the base file, (1,1) for the index file, and (2,1) for the base file. It will show the abort undo deletes for record (1,1) from the base and index files and the abort (or forgotten abort transaction) for $t_1$, followed by the index insert for $t_2$ and its commit.

However, in this example, the replication engine is a logical replicator. It will insert the entire logical record (base and index files) when it sees a base file insert, and it will ignore the index file inserts. In this scenario, it will insert record (1,1) but will be blocked from inserting record (2,1) by the lock held on index record 1 by t1. Since the replicator is enforcing natural flow order, it cannot process further commands and therefore cannot see that t1 eventually aborts and releases this lock. In a practical sense, the replication engine will wait until the insert of (2,1) times out waiting for the lock of the index record to free (and it never does).

Instead, assume that the replicator does a partial commit as described earlier in order to resolve the locking situation, i.e. it "pre-commits" t1 and/or t2 (note that when a pre-commit sequence occurs for a transaction, the replicator should mark that transaction and replay all subsequent events for it including all undo events, followed by a commit, in order to ultimately end up at the correct target file or table result). The lock on index record 1 is now released, and the replicator is free to attempt to insert record (2,1). However, this will now fail because record (1,1) exists (the unique index records collide). The replicator may try to change the insert to an update, but this will fail because record (2,1) does not exist.

At this point, the replicator will discard record (2,1) and then, following the audit trail, will delete record (1,1) as instructed by the audit trail. The result is that no records are added to the target file, which is not the desired result.

Situations such as this can be properly resolved by one of several algorithms:

a) Accumulate Index Inserts

When a base table insert is found, hold it until all significant index inserts (for instance, all unique index inserts) are also received. At this point, the base table logical update can be safely applied.

b) Set-Aside Queue

If a database access times out on a lock (whether as described above or because other external processes collide with it), place it in a first-in, first-out Set-Aside Queue. Append to the end of the queue any further modifications to the affected table or table partition, even if they are being applied by other transactions. Also, optionally place further events for this transaction and optionally other events for those other transactions for other tables or table partitions in the queue if the preservation of intra-transaction natural flow is desired. That is, once an event is on the queue, always append related events for the same table or table partition (and optionally for all participating transactions) to the queue.

After enqueuing an event onto the Set Aside queue, return to processing the next audit event. Upon the occurrence of certain significant events, attempt to replay the Set-Aside Queue. Replay all events in the queue until a lock occurs on replay or the queue is emptied. Significant events may include:

(i) commits/aborts (locks may have been freed up).
(ii) time interval expiration (locks held by other applications may have been freed up).
(iii) other (e.g., a certain number of events or transactions have been processed).

Intra-transaction natural flow can be preserved as can be inter-transaction natural flow so far as each table is concerned. Inter-table natural flow may not be preserved, unless all events in the audit are enqueued until the significant event(s) are received and processed. Depending upon the options chosen, this may cause some referential integrity violations such as the improper creation order of parent/child records or rows. It can be mitigated by having the replicator consider such events to be related in this algorithm. At the end, when all affected transactions end, the data base will return to a fully consistent state.

c) Set-Aside Queue with Transaction End-State Processing

Similar to the Set-Aside queue approach, this algorithm builds the Set-Aside queue as described above. The following significant events are treated differently:

(i) When an abort event is received, abort the transaction (which will undo all the changes it made in the target database) and dequeue and discard all queued events for it from the Set Aside queue. Then try to replay the Set Aside queue as described above. Note that if this transaction had been previously partially committed, i.e. a precommit was done for it, the abort event must be processed as if it were a commit event (as described below) with all undo events processed in proper order.
(ii) When a commit event is received, process all events for the transaction in the order they are queued on the Set Aside queue. Process these events to completion, and then commit the transaction. Then try to replay the Set Aside queue as described above.

d) Asynchronous Database Access

Use asynchronous file access to access the database. In this way, a lock will not hold up the replicator; and the database accesses to follow can be initiated in natural flow order.

In effect, asynchronous database access allows all database accesses to be initiated in natural flow order. Using this technique, the replication engine does not wait for each initiation to complete before initiating the next database access in sequence. These accesses will be executed in natural flow order so long as the database preserves initiation order during execution.

There are many ways to implement asynchronous database access. They include asynchronous calls, a separate thread for each transaction, or parallel Appliers.

D. Summary

The previous discussions have described various architectures for multi-threading Extractors, communication channels, and Appliers. Many of these architectures, including permutations, can be used in conjunction with each other to create powerful replication engines. Some permutations and combinations are shown in FIGS. 11a-d. Each has different performance and serialization characteristics.

FIG. 11a shows a single Extractor also acting as a Router. It reads the Change Queue and sends each transaction to a specific Applier on the target system. The configuration preserves the natural flow of changes within a transaction, but does not preserve transaction order. The target system is multi-threaded, but the source Extractor is single-threaded.

However, the architecture of FIG. 11a can be used to also guarantee transaction order. To do this, the Extractor will suspend its activity following the sending of a commit command to an Applier until that Applier has acknowledged that it has completed the commit. Alternatively, the Appliers can coordinate their commits among themselves. Both of these strategies have been described earlier.

Figure 11B:
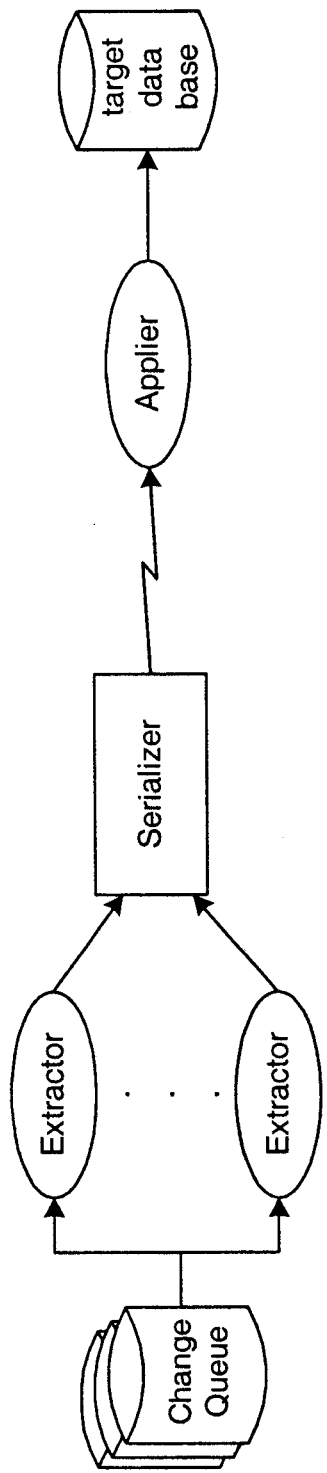

In FIG. 11b, multiple Extractors read one or more Change Queues and send all changes to a Serializer. The Serializer delivers a change flow to the communication channel in full natural flow order for both intra-transaction changes and for the transactions themselves. A single communication channel and a single Applier ensure the natural flow of change data to the target database. The source system is multi-threaded, but the target system is single-threaded.

Figure 11C:
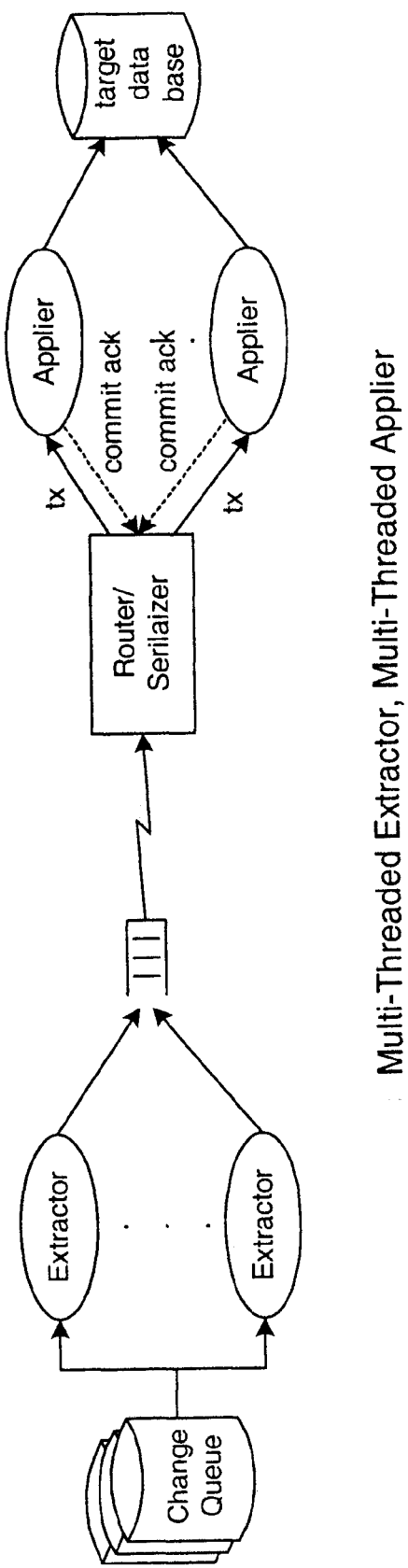

FIG. 11c shows multi-threaded Extractors sending changes over a single communication channel to a target Router. The Router provides serialization services and routes each transaction to an appropriate Applier. Commits are coordinated via one of the algorithms previously described. Changes and transactions are applied to the target database in natural flow order, and both source and target systems are multi-threaded. This architecture will also work with multiple communication lines. With a single communication line, the natural flow of changes within a transaction can be controlled by the Extractors. However, if multiple communication lines feeding from a common communication queue are used, then proper change order must be provided by a Router/Serializer on the target node unless a higher communication level is provided to guarantee message order upon delivery.

Figure 11D:
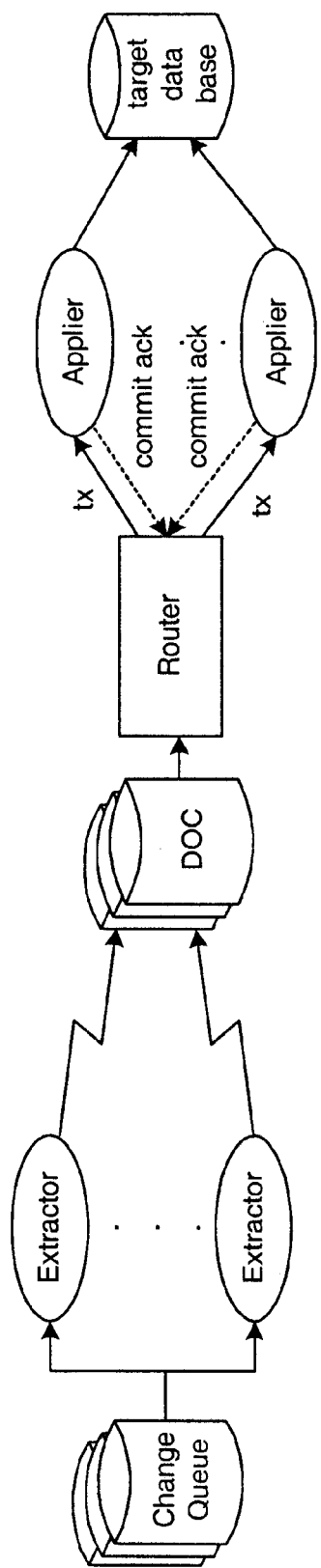

FIG. 11d shows the configuration of FIG. 11c but with a DOC at the target system receiving and storing all changes before they are applied to the target database. In this case, the DOC can provide all serialization functions; and the Router is much simpler. It needs only to route transactions and sequence commits. In fact, the functions of the Router can be implemented via the key structure of the DOC coupled with proper coordination between the Appliers.

Furthermore, the interaction between the Extractors and Appliers may take different forms:

1. In the simplest case, an Extractor sends just one update or begin/end command at a time. It waits for an acknowledgement from its Applier before it sends the next one. If there is only one Extractor, then this guarantees natural flow order but with a serious performance penalty.

2. An Extractor can send begin commands and updates as fast as it can but pause for acknowledgements on commits.

3. An Extractor can send all events as fast as it can and let the Appliers coordinate their commits.

4. If transaction order is not important, Extractors and Appliers can both operate at full speed.

From a performance viewpoint, the configuration shown in FIG. 11c is the best choice because it is fully multi-threaded and has no queuing points. Multiple communication lines can be provided. The Extractors can operate at full speed. The Appliers can also proceed at full speed, pausing only to coordinate their commits (and possibly to resolve deadlocks).

The point is that there are many ways to configure a data replication engine to achieve an application's performance and database consistency requirements. But attention must be paid to natural flow if the database is to remain consistent and uncorrupted.

FIGS. 11a-11d show only some permutations and combinations of replication engine components. For instance, a combined Extractor/Applier may be resident on the source system and "push" changes to the target database using RPCs (remote procedure calls) or some equivalent mechanism. Likewise, a combined Extractor/Applier may reside on the target system and "pull" changes from the source system via RPCs or an equivalent mechanism. In any event:

A serializing facility that will restore natural flow is required following all data replication threads and before the target database in order to guarantee that the database will remain consistent and uncorrupted.

The one exception to this rule is when there is no inter-transaction relationship to be maintained. If the application is such that transactions can be applied in any order, then it is only necessary to serialize modifications within a transaction. This can be done by ensuring that all modifications associated with a given file, table, or file/table partition are always sent over the same thread.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

Changes can be made to the embodiments described above without departing from the broad inventive concept thereof. The present invention is thus not limited to the particular embodiments disclosed, but is intended to cover modifications within the spirit and scope of the present invention.

We claim:

1. A computer-implemented method of processing base level data of a change queue in which an order of the data is not serialized at a logical level due to multi-threading in one or more extractors, communication channels or appliers, the base level change queue data being transaction data previously posted to a source database, the method comprising:
   (a) providing a logical replication engine which uses multi-threading in the one or more extractors, communication channels or appliers to replicate and post the base level change queue data to a target database in the order that the transaction data is stored in the change queue; and
   (b) upon detection in the logical replication engine of base level change queue data in which the order of the base level change queue data is not serialized at the logical level due to the multi-threading in the one or more extractors, communication channels or appliers, serializing the order of the base level change queue data at the logical level before the logical replication engine applies the base level change queue data to the target database, which ensures referential integrity, including resolving required foreign keys, and preserving required intra- and inter-transaction dependencies, in the target database.

2. The method of claim 1 wherein the serializing in step (b) is performed by accumulating index inserts.

3. The method of claim 1 wherein the serializing in step (b) is performed with a set-aside queue.

4. The method of claim 1 wherein the serializing in step (b) is performed with a set-aside queue with transaction end-state processing.

5. The method of claim 1 wherein the change queue is a change log.

6. The method of claim 1 wherein the change queue is an audit trail.

7. The method of claim 1 wherein the change queue is a database of changes.

8. A computer-implemented method of processing base level data of a change queue in which an order of the data is not serialized at a logical level due to multi-threading in one or more extractors, communication channels or appliers, the base level change queue data being transaction data previously posted to a source database, the method comprising:
   (a) providing a logical replication engine which uses multi-threading in the one or more extractors, communication channels or appliers to replicate the base level change queue data in which the order of the base level change queue data is not serialized at the logical level to a target database; and
   (b) posting the base level change queue data that is not serialized at the logical level due to the multi-threading in the one or more extractors, communication channels or appliers to the target database by asynchronous database access operations, which ensures that subsequent database accesses on the target database are initiated in natural flow order by resolving required foreign keys, and preserving required intra- and inter-transaction dependencies, in the target database.

9. The method of claim 8 wherein step (a) replicates the base level change queue data to the target database in the order that the transaction data is stored in the change queue.

10. The method of claim 8 wherein the asynchronous database access operations use asynchronous calls to the target database.

11. The method of claim 8 wherein the change queue is a change log.

12. The method of claim 8 wherein the change queue is an audit trail.

13. The method of claim 8 wherein the change queue is a database of changes.

14. A computer program product for processing base level data of a change queue in which an order of the data is not serialized at a logical level due to multi-threading in one or more extractors, communication channels or appliers, the base level change queue data being transaction data previously posted to a source database, the computer program product comprising a non-transitory computer-readable storage medium encoded with computer-executable instructions for performing the steps of:
   (a) providing a logical replication engine which uses multi-threading in the one or more extractors, communication channels or appliers to replicate and post the base level change queue data to a target database in the order that the transaction data is stored in the change queue; and
   (b) upon detection in the logical replication engine of base level change queue data in which the order of the base level change queue data is not serialized at the logical level due to the multi-threading in the one or more extractors, communication channels or appliers, serializing the order of the base level change queue data at the logical level before the logical replication engine applies the base level change queue data to the target database, which ensures referential integrity, including resolving required foreign keys, and preserving required intra- and inter-transaction dependencies, in the target database.

15. The computer program product of claim 14 wherein the serializing in step (b) is performed by accumulating index inserts.

16. The computer program product of claim 14 wherein the serializing in step (b) is performed with a set-aside queue.

17. The computer program product of claim 14 wherein the serializing in step (b) is performed with a set-aside queue with transaction end-state processing.

18. The computer program product of claim 14 wherein the change queue is a change log.

19. The computer program product of claim 14 wherein the change queue is an audit trail.

20. The computer program product of claim 14 wherein the change queue is a database of changes.

21. A computer program product for processing base level data of a change queue in which an order of the data is not serialized at a logical level due to multi-threading in one or more extractors, communication channels or appliers, the base level change queue data being transaction data previously posted to a source database, the computer program product comprising a non-transitory computer-readable storage medium encoded with computer-executable instructions for performing the steps of:

(a) providing a logical replication engine which uses multi-threading in the one or more extractors, communication channels or appliers to replicate the base level change queue data in which the order of the base level change queue data is not serialized at the logical level to a target database; and (b) posting the base level change queue data that is not serialized at the logical level due to the multi-threading in the one or more extractors, communication channels or appliers to the target database by asynchronous database access operations, which ensures that subsequent database accesses on the target database are initiated in natural flow order by resolving required foreign keys, and preserving required intra- and inter-transaction dependencies, in the target database.

22. The computer program product of claim 21 wherein step (a) replicates the base level change queue data to the target database in the order that the transaction data is stored in the change queue.

23. The computer program product of claim 21 wherein the asynchronous database access operations use asynchronous calls to the target database.

24. The computer program product of claim 21 wherein the change queue is a change log.

25. The computer program product of claim 21 wherein the change queue is an audit trail.

26. The computer program product of claim 21 wherein the change queue is a database of changes.

\* \* \* \* \*